United States Patent
Nakamura

(10) Patent No.: US 8,614,594 B2
(45) Date of Patent: Dec. 24, 2013

(54) DOWNCONVERTER, DOWNCONVERTER IC, AND METHOD FOR CONTROLLING THE DOWNCONVERTER

(75) Inventor: Yoshiaki Nakamura, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

(21) Appl. No.: 13/469,265

(22) Filed: May 11, 2012

(65) Prior Publication Data
US 2012/0293235 A1 Nov. 22, 2012

(30) Foreign Application Priority Data
May 16, 2011 (JP) ................ 2011-109529

(51) Int. Cl.
*G05F 1/10* (2006.01)
(52) U.S. Cl.
USPC ............ 327/105; 327/544; 455/132; 375/319
(58) Field of Classification Search
USPC ............... 327/355–361, 105, 544; 455/132; 375/319
See application file for complete search history.

(56) References Cited

U.S. PATENT DOCUMENTS

| 7,957,703 B2 * | 6/2011 | Nakatani et al. ............... 455/82 |
| 8,378,732 B2 * | 2/2013 | Kousai et al. ............... 327/355 |
| 2003/0133049 A1 | 7/2003 | Cowley et al. |
| 2010/0291862 A1 | 11/2010 | Mitsunaka et al. |

FOREIGN PATENT DOCUMENTS

| JP | 2002-190749 A | 7/2002 |
| JP | 2003-198401 A | 7/2003 |
| JP | 2010-268296 A | 11/2010 |

OTHER PUBLICATIONS

Tino Copani et al., A 12-GHz Silicon Bipolar Dual-Conversion Receiver for Digital Satellite Applications, IEEE Journal of Solid-State Circuits, vol. 40, No. 6, Jun. 2005, pp. 1278-1287.

* cited by examiner

*Primary Examiner* — Dinh T. Le
(74) *Attorney, Agent, or Firm* — Foley & Lardner LLP

(57) ABSTRACT

A downconverter capable of being normally operated even in the case where a universal dual downconverter is made up by use of multiple downconverter circuits. The downconverter includes first and second downconverter circuits, and an amplification unit having at least a first amplifier LNA for receiving a horizontally polarized wave signal, and a second amplifier LNA for receiving a vertically polarized wave signal. If a Tone/Pola signal is a signal indicating a power-saving mode, a control circuit of the first downconverter circuit causes both a local oscillator and a frequency converter to be in a non-operating state, controlling a bias circuit such that power is supplied to the first amplifier LNA.

15 Claims, 14 Drawing Sheets

FIG. 4

| CONTROL SIGNAL | OUT | OUT1 OUT2 OFF | OUT1 ON | | | | OUT2 ON | | | |
|---|---|---|---|---|---|---|---|---|---|---|
| | | | High (HORIZONTALLY POLARIZED WAVE) | | Low (VERTICALLY POLARIZED WAVE) | | High (HORIZONTALLY POLARIZED WAVE) | | Low (VERTICALLY POLARIZED WAVE) | |
| | POLARIZATION SIGNAL | OFF | OFF | | OFF | | OFF | | OFF | |
| | TONE SIGNAL | OFF | — | 22 kHz | — | 22 kHz | — | 22 kHz | — | 22 kHz |
| STATE | VCO BAND | OFF | Low (VCO1) | High (VCO1) | Low (VCO1) | High (VCO1) | Low (VCO2) | High (VCO2) | Low (VCO2) | High (VCO2) |
| | LNA1 | | ON | ON | ON | ON | ON | ON | ON | ON |
| | LNA2 | | ON | ON | ON | ON | ON | ON | ON | ON |
| | LNA3 | | ON | ON | OFF | OFF | — | — | — | — |
| | LNA4 | OFF | — | — | — | — | ON | ON | OFF | OFF |
| | LNA5 | | OFF | OFF | ON | ON | OFF | OFF | — | — |
| | LNA6 | | — | — | — | — | ON | OFF | ON | ON |

FIG. 5

| CONTROL SIGNAL | OUT | | OUT1 ON / OUT2 OFF | | | | OUT1 OFF / OUT2 ON | | | |
|---|---|---|---|---|---|---|---|---|---|---|
| | POLARIZATION SIGNAL | | High (HORIZONTALLY POLARIZED WAVE) | | Low (VERTICALLY POLARIZED WAVE) | | High (HORIZONTALLY POLARIZED WAVE) | | Low (VERTICALLY POLARIZED WAVE) | |
| | TONE SIGNAL | | OFF | 22 kHz | OFF | 22 kHz | OFF | 22 kHz | OFF | 22 kHz |
| STATE | VCO BAND | | Low (VCO1) | High (VCO1) | Low (VCO1) | High (VCO1) | Low (VCO2) | High (VCO2) | Low (VCO2) | High (VCO2) |
| | LNA1 | | ON | ON | OFF | OFF | OFF | ON | ON | ON |
| | LNA2 | | ON | ON | ON | ON | OFF | OFF | OFF | ON |
| | LNA3 | | ON | OFF | OFF | OFF | OFF | OFF | OFF | OFF |
| | LNA4 | | OFF | OFF | ON | ON | ON | OFF | OFF | OFF |
| | LNA5 | | OFF | OFF | OFF | OFF | OFF | OFF | OFF | OFF |
| | LNA6 | | OFF | OFF | OFF | OFF | OFF | OFF | ON | ON |

FIG. 12

| CONTROL SIGNAL | | OUT101 OUT102 OFF | OUT101 ON | | | | OUT102 ON | | | |
|---|---|---|---|---|---|---|---|---|---|---|
| | OUT | | High (HORIZONTALLY POLARIZED WAVE) | | Low (VERTICALLY POLARIZED WAVE) | | High (HORIZONTALLY POLARIZED WAVE) | | Low (VERTICALLY POLARIZED WAVE) | |
| | POLARIZATION SIGNAL | OFF | | | | | | | | |
| | TONE SIGNAL | OFF | OFF | 22 kHz | OFF | 22 kHz | OFF | 22 kHz | OFF | 22 kHz |
| STATE | VCO BAND | OFF | Low (VCO111) | High (VCO111) | Low (VCO111) | High (VCO111) | Low (VCO112) | High (VCO112) | Low (VCO112) | High (VCO112) |
| | LNA111 | | ON | ON | ON | ON | ON | ON | ON | ON |
| | LNA112 | | ON | ON | ON | ON | ON | ON | ON | ON |
| | LNA113 | | ON | ON | OFF | OFF | – | – | – | – |
| | LNA114 | | – | – | – | – | ON | ON | OFF | OFF |
| | LNA115 | | OFF | OFF | ON | ON | – | – | – | – |
| | LNA116 | | – | – | – | – | OFF | OFF | ON | ON |

FIG. 13

| CONTROL SIGNAL | | OUT | OUT1 ON / OUT2 OFF | | | | OUT1 OFF / OUT2 ON | | | |
|---|---|---|---|---|---|---|---|---|---|---|
| | | POLARIZATION SIGNAL | High (HORIZONTALLY POLARIZED WAVE) | | Low (VERTICALLY POLARIZED WAVE) | | High (HORIZONTALLY POLARIZED WAVE) | | Low (VERTICALLY POLARIZED WAVE) | |
| | | TONE SIGNAL | OFF | 22 kHz | OFF | 22 kHz | OFF | 22 kHz | OFF | 22 kHz |
| | | VCO BAND | Low (VCO111) | High (VCO111) | Low (VCO111) | High (VCO111) | Low (VCO112) | High (VCO112) | Low (VCO112) | High (VCO112) |
| STATE | | LNA111 | ON | OFF | OFF | OFF | OFF | OFF | OFF | OFF |
| | | LNA112 | OFF | ON | OFF | OFF | OFF | OFF | OFF | OFF |
| | | LNA113 | OFF | OFF | ON | OFF | ON | OFF | OFF | OFF |
| | | LNA114 | OFF | OFF | OFF | ON | OFF | ON | OFF | OFF |
| | | LNA115 | OFF | OFF | OFF | OFF | OFF | OFF | ON | OFF |
| | | LNA116 | OFF | OFF | OFF | OFF | OFF | OFF | OFF | ON |

DOWNCONVERTER, DOWNCONVERTER IC, AND METHOD FOR CONTROLLING THE DOWNCONVERTER

CROSS-REFERENCE TO RELATED APPLICATIONS

The disclosure of Japanese Patent Application No. 2011-109529 filed on May 16, 2011 including the specification, drawings, and abstract is incorporated herein by reference in its entirety.

BACKGROUND

The present invention relates to a downconverter, a downconverter IC, and a method for controlling the downconverter, and in particular, to a downconverter for down-converting a polarized wave signal as received, a downconverter IC, and a method for controlling the downconverter.

For converting the frequency of a satellite wave as received into an intermediate frequency (hereinafter referred to also as an IF frequency) that is transmittable via a cable, use is being made of a low noise block downconverter (LNB downconverter: Low Noise Block downconverter).

FIG. 14 is a block diagram for describing a satellite reception converter (downconverter) disclosed in Patent Document 1. With the satellite reception converter shown in FIG. 14, a BS signal of a horizontally polarized wave or a vertically polarized wave, received via a parabola antenna (not shown), is inputted thereto from BS signal terminals 221, 222, respectively, and amplifier circuits 223, 224, in an initial stage, together with an amplifier circuit 225, in a second stage, are disposed in a back stage of the BS signal terminals 221, 222, respectively. The respective amplifier circuits 223, 224, in the initial stage, amplify the BS signal of the horizontally polarized wave or the vertically polarized plane wave, inputted from the BS signal terminals 221, 222, respectively. Then, the amplifier circuit 225, in the second stage, further amplifies an output of either the amplifier circuit 223 or the amplifier circuit 224, in the initial stage.

The amplifier circuits 223 to 225 each are a low-noise high-frequency amplifier for operating at a high frequency by use of a high electron mobility transistor (HEMT: High Electron Mobility Transistor), and so forth. In order to enable the amplifier circuit 223 or the amplifier circuit 224 to receive either the horizontally polarized wave or the vertically polarized plane wave, it is necessary to selectively switch between respective voltages supplied to these amplifier circuits. For this reason, selective switching between the voltages to be supplied to the amplifier circuit 223 and the amplifier circuit 224, respectively, is made in a switching circuit 310 incorporated in a satellite reception converter IC 201. More specifically, a voltage necessary for the amplifier circuit 223 or the amplifier circuit 224 is supplied from terminals 211, 212, or terminals 213, 214, respectively, according to whether a received BS signal is the horizontally polarized wave or the vertically polarized wave. Further, in order for the amplifier circuit 225, in the second stage, to amplify the BS signal of either the horizontally polarized wave or the vertically polarized wave, a necessary voltage is supplied thereto from terminals 215, 216, respectively, at all tines while the BS signal is being received.

An output of the amplifier circuit 225 is further amplified by an amplifier circuit 311 incorporated in the satellite reception converter IC 201 to be converted into a BS-IF signal at an intermediate frequency by a frequency converter 312. The BS-IF signal is further amplified by a back-stage amplifier circuit 313, and subsequently, a DC component is removed from the BS-IF signal by a capacitor 204 to be sent out to a BS tuner (not shown) via a cable (not shown).

Further, a PLL circuit 314 including a local oscillation circuit outputs a local oscillation signal for converting low band frequencies in a range of 10.7 to 11.7 GHz and high band frequencies in a range of 11.7 to 12.75 GHz in received frequencies in a range of 10.7 to 12.75 GHz into the frequency of the BS-IF signal.

A DC voltage signal for controlling switching of a polarized wave received from the BS tuner is inputted to the switching circuit 310. More specifically, the DC voltage signal at either 13V or, doubling as a power supply voltage, is inputted to the switching circuit 310, and the switching circuit 310 detects magnitude of the DC voltage signal that is inputted, thereby making a decision as to which of the amplifier circuits 223, 224 in the initial stage is put to use.

A voltage generation source 315 for generating plus and minus voltages according to the magnitude of the DC voltage signal detected by the switching circuit 310 provides either the amplifier circuit 223 or the amplifier circuit 224, and the amplifier circuit 225, with the plus and minus voltages via the terminals 211 to 216, respectively.

The high electron mobility transistor (HEMT) for use in the amplifier circuits 223 to 225, respectively, is normally activated by supplying a gate terminal with the minus voltage, and supplying a drain terminal with the plus voltage. For example, in the case of using the amplifier circuit 223, the satellite reception converter IC 201 generates the minus voltage from the terminal 213, supplying the gate terminal of the HEMT with the minus voltage. The satellite reception converter IC 201 concurrently generates the plus voltage from the terminal 214, supplying the drain terminal of the HEMT with the pus voltage. As to voltage supply to the amplifier circuit 224 that is out of use at this time, a voltage for inactivating the HEMT for use in the amplifier circuit 224 is supplied from the terminals 211, 212, respectively.

With such a configuration as described above, an output signal of the amplifier circuit 223 is supplied to the amplifier circuit 225. The amplifier circuit 225 is also activated as is the case with the amplifier circuit 223, and the minus voltage outputted from the terminal 215 of the satellite reception converter IC 201 is supplied to the gate terminal of the HEMT. The plus voltage outputted from the terminal 216 is concurrently supplied to the drain terminal of the HEMT. By so doing, the BS signal amplified by the amplifier circuit 225 is supplied to the amplifier circuit 311 of the satellite reception converter IC 201.

In the case of using the amplifier circuit 224, the satellite reception converter IC 201 generates the minus voltage from the terminal 211, supplying the gate terminal of the HEMT with the minus voltage. The satellite reception converter IC 201 concurrently generates the plus voltage from the terminal 212, supplying the drain terminal of the HEMT with the plus voltage. At this time, a voltage for inactivating the HEMT for use in the amplifier circuit 223 is supplied to the amplifier circuit 223 that is out of use.

With the satellite reception converter shown in FIG. 14, the switching circuit 310 for switching between the amplifier circuit 223, and the amplifier circuit 224 is incorporated in the satellite reception converter IC 201. That is, the satellite reception converter IC 201 is provided with the circuits for generating the minus voltage for activating the amplifier circuit 223, or the amplifier circuit 224 in order to receive either the horizontally polarized wave, or the vertically polarized plane wave.

Further, in Patent Document 2, there has been disclosed a technology relating to a downconverter capable of enhancing isolation of LNBs in whole. In Patent Document 3, there has been disclosed a technology relating to a tuner device capable of single-handedly receiving respective signals from a plurality of channels. In Non-patent Document 1, there has been disclosed a technology relating to a universal single type LNB.

[Patent Document 1]
Japanese Unexamined Patent Publication No. 2010-268296
[Patent Document 2]
Japanese Unexamined Patent Publication No. 2002-190749
[Patent Document 3]
Japanese Unexamined Patent Publication No. 2003-198401
[Non-patent Document 1]
Tino Copani, "A 12-GHz Silicon Bipolar Dual-Conversion Receiver for Digital Satellite Applications", IEEE JOURNAL OF SOLID-STATE CIRCUITS, VOL. 40, NO. 6, JUNE 2005

SUMMARY

In the case where a universal dual downconverter is made up by use of the downconverter IC disclosed in Patent Document 1, there is conceivable, for example, a configuration shown in FIG. 9 (the configuration shown in FIG. 9 is a configuration derived by the inventors of the present application). In this connection, "universal dual" refers to a configuration capable of outputting two intermediate frequency signals, in the specification of, for example, DisEqc (Digital Satellite Equipment Control). With the downconverter shown in FIG. 9, a horizontally polarized wave signal (H) 105, and a vertically polarized wave signal (V) 106 are received by one parabola antenna, and intermediate frequency signals OUT101, OUT102, after down-conversion, are outputted from downconverter circuits 101, 102, respectively.

The downconverter shown in FIG. 9 is provided with an amplification unit 103, and the downconverter circuits 101, 102. The amplification unit 103 is provided with a plurality of amplifiers {low noise amplifiers (LNA: Low Noise Amplifier)} for amplifying the horizontally polarized wave signal 105 and the vertically polarized wave signal 106, received by a parabola antenna 104, respectively.

The horizontally polarized wave signal 105 received by the parabola antenna 104 is amplified by an LNA 111 to be outputted to an LNA 113 and an LNA 114. The LNA 113 amplifies the horizontally polarized wave signal that has been amplified by the LNA 111 to be subsequently outputted to an input terminal 131 of the downconverter circuit 101. The LNA 114 amplifies the horizontally polarized wave signal that has been amplified by the LNA 111 to be subsequently outputted to an input terminal 141 of the downconverter circuit 102.

The vertically polarized wave signal 106 received by the parabola antenna 104 is amplified by an LNA 112 to be outputted to an LNA 115 and an LNA 116. The LNA 115 amplifies the vertically polarized wave signal that has been amplified by the LNA 112 to be subsequently outputted to the input terminal 131 of the downconverter circuit 101. The LNA 116 amplifies the vertically polarized wave signal that has been amplified by the LNA 112 to be subsequently outputted to the input terminal 141 of the downconverter circuit 102.

More specifically, the horizontally polarized wave signal 105 is supplied to the input terminal 131 of the downconverter circuit 101 via the LNA 111 and the LNA 113 while the vertically polarized wave signal 106 is supplied to the input terminal 131 of the downconverter circuit 101 via the LNA 112 and the LNA 115. Further, the horizontally polarized wave signal 105 is supplied to the input terminal 141 of the downconverter circuit 102 via the LNA 111 and the LNA 114 while the vertically polarized wave signal 106 is supplied to the input terminal 141 of the downconverter circuit 102 via the LNA 112 and the LNA 116.

The downconverter circuit 101 includes a reference signal generator 115, a local oscillator 116, a frequency converter 117, an LNA bias circuit 118, and a control circuit 119. The reference signal generator 115 includes a crystal oscillation circuit REF111 and a buffer B111. The crystal oscillation circuit REF111 generates a reference signal 154 having a predetermined reference frequency, outputting the reference signal 154 to the local oscillator 116. In this connection, the crystal oscillation circuit REF111 generates the reference signal 154 by making use of a quartz resonator X'tal (111) coupled to a terminal 133. The local oscillator 116 generates a local oscillation frequency signal 153 by use of the reference signal 154.

The frequency converter 117 is provided with a preamp AMP111, a mixer MIXER 111, a lowpass filter F111, and an IF amp AMP112. The preamp AMP111 amplifies the horizontally polarized wave signal or the vertically polarized wave signal inputted to the input terminal 131 to be outputted to the mixer MIXER 111. The mixer MIXER 111 down-converts an amplified horizontally polarized wave signal, or an amplified vertically polarized wave signal, outputted from the preamp AMP111, by making use of the local oscillation frequency signal 153 outputted from the local oscillator 116. A down-converted horizontally polarized wave signal or a down-converted vertically polarized wave signal, an unnecessary component thereof being removed by the filter F111, is further amplified by the IF amp AMP112 to be outputted as the intermediate frequency signal OUT101 from an output terminal 132.

The LNA bias circuit 118 supplies the LNA 111 with power via a terminal 137, supplying the LNA 113 with power via a terminal 136 while supplying the LNA 115 with power via a terminal 138. The control circuit 119 controls the LNA bias circuit 118 and the local oscillator 116 in accordance with a Tone/Pola signal inputted from a control signal input terminal 135.

FIG. 10 is a view showing one example of a Tone/Pola signal. As shown in FIG. 10, the Pola (Polarization) signal is a DC voltage signal at, for example, 13V, or 18V. Further, the Tone signal is a signal of an AC component (22 kHz), and is superimposed on the Pola signal representing a DC component.

If the DC component of the Tone/Pola signal is at 18V as shown in FIG. 10, the control circuit 119 controls the LNA bias circuit 118 such that the horizontally polarized wave signal is supplied to the input terminal 131 of the downconverter circuit 101. On the other hand, if the DC component of the Tone/Pola signal is 13V, the control circuit 119 controls the LNA bias circuit 118 such that the vertically polarized wave signal is supplied to the input terminal 131 of the downconverter circuit 101.

Further, if a signal at 22 kHz, as the AC component of the Tone/Pola signal, is being supplied, the control circuit 119 controls the local oscillator 116 such that the local oscillation frequency signal 153 (10.6 GHz) in a high band is outputted. On the other hand, if the AC component of the Tone/Pola signal is in the OFF state, the control circuit 119 controls the local oscillator 116 such that the local oscillation frequency signal 153 (9.75 GHz) in a low band is outputted.

The downconverter circuit 102 includes a reference signal generator 125, a local oscillator 126, a frequency converter 127, an LNA bias circuit 128, and a control circuit 129. Herein, the downconverter circuit 102 is identical in configuration to the downconverter circuit 101, omitting therefore duplicated description thereof. The LNA bias circuit 128 supplies the LNA 112 with power via a terminal 148, supplies the LNA 114 with power via a terminal 146 and supplies the LNA 116 with power via a terminal 147.

FIG. 11 is a view for describing the case of supplying the downconverter shown in FIG. 9 with power, and a Tone/Pola signal. The intermediate frequency signal OUT101 subjected to down-conversion in the downconverter circuit 101, the DC component thereof being removed by a capacitor C112, is supplied to a tuner (Tuner 101) via a cable. Meanwhile, the tuner (Tuner 101) supplies the downconverter circuit 101 with the power, and the Tone/Pola signal via the same cable as used in the transmission of the intermediate frequency signal OUT101. Herein, the DC component (13V or 18V) of the Tone/Pola signal is used as the power supplied to the downconverter circuit 101.

The DC component (13V or 18V) of the Tone/Pola signal is supplied to a regulator REG111 via a strip line SL112. The regulator REG111 adjusts the voltage at 13V or 18V to a voltage matching the maximum rating of the downconverter circuit 101 to be subsequently supplied to a power supply terminal VDD of the downconverter circuit 101.

Further, the Tone/Pola signal is supplied to a resistor R112 and a capacitor C111 via a strip line SL111. Herein, the DC component of the Tone/Pola signal is divided by the agency of the resistor R112 and the resistor R111, respectively. More specifically, the Pola signal is reduced to the voltage matching the maximum rating of the downconverter circuit 101 by use of the resistor R112 and the resistor R111 to be delivered to the control signal input terminal 135. On the other hand, the Tone signal passes through the capacitor C111, and the presence or absence of a pulse is checked inside the downconverter circuit 101.

Further, the power is supplied to the LNA111, LNA113 and LNA115 in the amplification unit 103 via the LNA bias circuit 118. Further, the case of supplying the downconverter circuit 102 with the power, and the Tone/Pola signal is the same as the case of supplying the downconverter circuit 101 with the power and the Tone/Pola signal.

FIG. 12 is a table for describing an operation of the downconverter shown in FIG. 9. In the case where the intermediate frequency signals OUT101, OUT102 are not outputted, the power from the tuners (Tuner 101, Tuner 102) is not supplied to the downconverter circuits 101, 102, respectively, and therefore, the downconverter circuits 101, 102 are turned OFF. As a result, the LNAs 111 to 116 are also turned OFF.

On the other hand, in the case where the intermediate frequency signals OUT101, OUT102 are outputted, the horizontally polarized wave signal 105 is supplied to the downconverter circuit 101 via the LNA111 and the LNA113, or the vertically polarized wave signal 106 is supplied to the downconverter circuit 102 via the LNA112 and the LNA116. Further, the horizontally polarized wave signal 105 is supplied to the downconverter circuit 102 via the LNA111 and the LNA114, or the vertically polarized wave signal 106 is supplied to the downconverter circuit 102 via the LNA112 and the LNA116. In this case, both the LNA111 and the LNA112 are in the ON state at all times.

If the Pola signal is High (18 V), the LNA 113 is turned ON and the LNA115 is turned OFF, whereupon the horizontally polarized wave signal 105 is supplied to the downconverter circuit 101. On the other hand, if the Pola signal is Low (13 V), the LNA 113 is turned OFF and the LNA115 is turned ON, whereupon the vertically polarized wave signal 106 is supplied to the downconverter circuit 101.

Similarly, if the Pola signal is High (18V), the LNA 114 is turned ON, and the LNA116 is turned OFF, whereupon the horizontally polarized wave signal 105 is supplied to the downconverter circuit 102. On the other hand, if the Pola signal is Low (13 V), the LNA 114 is turned OFF and the LNA116 is turned ON, whereupon the vertically polarized wave signal 106 is supplied to the downconverter circuit 102.

Further, as shown in FIG. 12, if the Tone signal is in the OFF state, a signal in the low band (9.75 GHz) is outputted as the local oscillation frequency signals 153, 163, respectively. On the other hand, if the Tone signal at 22 kHz is superimposed, a signal in the high band (10.6 GHz) is outputted as the local oscillation frequency signals 153, 163, respectively. Further, in the case where the intermediate frequency signals OUT101, OUT102 are outputted, the power from the tuners (Tuner 101, Tuner 102) is supplied to the downconverter circuits 101, 102, respectively.

Next, referring to FIG. 13, there is described hereinafter the case where only the intermediate frequency signal OUT101 or the intermediate frequency signal OUT102 is outputted. If only one of the intermediate frequency signals is outputted, the downconverter circuit where the other of the intermediate frequency signals is not outputted is turned OFF. By so doing, power consumption of the downconverter can be reduced.

First, there is described hereinafter the case where the intermediate frequency signal OUT101 is outputted while the intermediate frequency signal OUT102 is not outputted (OUT101 is ON and OUT102 is OFF). In this case, the horizontally polarized wave signal 105 is supplied to the downconverter circuit 101 when both the LNA 111 and the LNA 113 are in the ON state. On the one hand, if the intermediate frequency signal OUT102 is not outputted, the power from the tuner (Tuner 102) shown in FIG. 11 is not supplied to the downconverter circuits 102. For this reason, the power is not supplied to the LNA 112 for use in amplifying the vertically polarized wave signal 106, so that the vertically polarized wave signal 106 is not supplied to the downconverter circuit 101.

There is described hereinafter the case where the intermediate frequency signal OUT102 is outputted while the intermediate frequency signal OUT101 is not outputted (OUT101 is OFF and OUT102 is ON). In this case, the vertically polarized wave signal 106 is supplied to the downconverter circuit 102 when both the LNA 112 and the LNA 116 are in the ON state. On the one hand, if the intermediate frequency signal OUT101 is not outputted, the power from the tuner (Tuner 101) shown in FIG. 11 is not supplied to the downconverter circuit 101. For this reason, the power is not supplied to the LNA 111 for use in amplifying the horizontally polarized wave signal 105, so that the horizontally polarized wave signal 105 is not supplied to the downconverter circuit 102.

In other words, with the downconverter shown in FIG. 9, the power is supplied to the LNA 112 by use of the LNA bias circuit 128 of the downconverter circuit 102. For this reason, if the downconverter circuit 102 is turned OFF, this will cause the LNA bias circuit 128 to be also turned OFF, thereby interrupting power supply to the LNA 112 as well, so that the vertically polarized wave signal 106 cannot be outputted to the downconverter circuit 101.

Similarly, with the downconverter shown in FIG. 9, the power is supplied to the LNA 111 by use of the LNA bias circuit 118 of the downconverter circuit 101. For this reason, if the downconverter circuit 101 is turned OFF, this will cause the LNA bias circuit 118 to be also turned OFF, thereby interrupting power supply to the LNA 111 as well, so that the horizontally polarized wave signal 105 cannot be outputted to the downconverter circuit 102. This is attributable to the downconverter circuits 101, 102 sharing the LNA 111, and the LNA 112.

Thus, in the case where the universal dual downconverter is made up by use of the downconverter IC as disclosed in Patent Document 1, a problem has been encountered in that if either one of the downconverter circuits (101 or 102) is turned OFF, the downconverter is not normally operated.

In accordance with a first aspect of the invention, a downconverter is provided with an amplification unit, a first downconverter circuit, and a second downconverter circuit, the amplification unit including at least a first amplifier for receiving a first polarized wave signal, and a second amplifier for receiving a second polarized wave signal, the first downconverter circuit including a first reference signal generator for generating a first reference signal having a first reference frequency, a first local oscillator for generating a first local oscillation frequency signal by use of the first reference signal, a first frequency converter for converting a signal amplified by the amplification unit into an intermediate frequency by use of the first local oscillation frequency signal, a first bias circuit for supplying the first amplifier with power; and a first control circuit for controlling the first reference signal generator, the first local oscillator, the first frequency converter, and the first bias circuit in accordance with a first control signal, the second downconverter circuit including a second reference signal generator for generating a second reference signal having a second reference frequency, a second local oscillator for generating a second local oscillation frequency signal by use of the second reference signal, a second frequency converter for converting a signal amplified by the amplification unit into an intermediate frequency by use of the second local oscillation frequency signal, a second bias circuit for supplying the second amplifier with power, and a second control circuit for controlling the second reference signal generator, the second local oscillator, the second frequency converter, and the second bias circuit in accordance with a second control signal. If the first control signal is a signal indicating a power-saving mode, the first control circuit causes both the first local oscillator and the first frequency converter to be in a non-operating state, and controls the first bias circuit such that power is supplied to the first amplifier, and if the second control signal is the signal indicating the power-saving mode, the second control circuit causes both the second local oscillator and the second frequency converter to be in the non-operating state, and controls the second bias circuit such that power is supplied to the second amplifier.

With the downconverter according to the invention, if the first control signal is the signal indicating the power-saving mode, both the first local oscillator and the first frequency converter are caused to be in the non-operating state, and the first bias circuit is controlled such that power is supplied to the first amplifier while if the second control signal is the signal indicating the power-saving mode, both the second local oscillator and the second frequency converter are caused to be in the non-operating state, and the second bias circuit is controlled such that power is supplied to the second amplifier. Accordingly, even if the first downconverter circuit is in the power-saving mode, the first amplifier can be turned ON, so that a polarized wave signal can be supplied to the second downconverter circuit. Further, even if the second downconverter circuit is in the power-saving mode, the second amplifier can be turned ON, so that a polarized wave signal can be supplied to the first downconverter circuit. Thus, even in the case where a universal dual downconverter is made up by use of a plurality of downconverter circuits, it is possible to provide a downconverter that can be normally operated.

In accordance with a second aspect of the invention, a downconverter IC is provided with a reference signal generator for generating a reference signal having a predetermined reference frequency, a local oscillator for generating a local oscillation frequency signal by use of the reference signal, a frequency converter for converting a polarized signal amplified by an amplifier into an intermediate frequency by use of the local oscillation frequency signal, a bias circuit for supplying the amplifier with power, and a control circuit for controlling the reference signal generator, the local oscillator, the frequency converter, and the bias circuit in accordance with a first signal. If the control signal is a signal indicating a power-saving mode, the control circuit causes both the local oscillator and the frequency converter to be in a non-operating state, and controls the bias circuit such that power is supplied to the amplifier.

A method for controlling a downconverter that is provided with an amplification unit, a first downconverter circuit, and a second downconverter circuit, the amplification unit including at least a first amplifier for receiving a first polarized wave signal, and a second amplifier for receiving a second polarized wave signal, the first downconverter circuit including a first reference signal generator for generating a first reference signal having a first reference frequency, a first local oscillator for generating a first local oscillation frequency signal by use of the first reference signal, a first frequency converter for converting a signal amplified by the amplification unit into an intermediate frequency by use of the first local oscillation frequency signal, a first bias circuit for supplying the first amplifier with power, and a first control circuit for controlling the first reference signal generator, the first local oscillator, the first frequency converter, and the first bias circuit in accordance with a first control signal, the second downconverter circuit including a second reference signal generator for generating a second reference signal having a second reference frequency, a second local oscillator for generating a second local oscillation frequency signal by use of the second reference signal, a second frequency converter for converting a signal amplified by the amplification unit into an intermediate frequency by use of the second local oscillation frequency signal, a second bias circuit for supplying the second amplifier with power, and a second control circuit for controlling the second reference signal generator, the second local oscillator, the second frequency converter, and the second bias circuit in accordance with a second control signal, the method includes causing both the first local oscillator and the first frequency converter to be in a non-operating state if the first control signal is a signal indicating a power-saving mode, controlling the first bias circuit such that power is supplied to the first amplifier, and causing both the second local oscillator and the second frequency converter to be in the non-operating state if the second control signal is a signal indicating the power-saving mode, controlling the second bias circuit such that power is supplied to the second amplifier.

With the method for controlling a downconverter, according to the invention, if the first control signal is the signal indicating the power-saving mode, both the first local oscillator and the first frequency converter are caused to be in the non-operating state, and the first bias circuit is controlled such that power is supplied to the first amplifier while if the second control signal is the signal indicating the power-saving mode, both the second local oscillator and the second frequency converter are caused to be in the non-operating state, and the second bias circuit is controlled such that power is supplied to the second amplifier. Accordingly, even if the first downconverter circuit is in the power-saving mode, the first amplifier can be turned ON, so that a polarized wave signal can be supplied to the second downconverter circuit. Further, even if the second downconverter circuit is in the power-saving mode, the second amplifier can be turned ON, so that a polarized wave signal can be supplied to the first downconverter circuit. Thus, even in the case where a universal dual downconverter is made up by use of a plurality of downconverter circuits, it is possible to provide a downconverter that can be normally operated.

The invention can provide a downconverter, and a downconverter IC that are normally operable even in the case where the universal dual downconverter is made up by use of a plurality of downconverter circuits, and a method for controlling the downconverter.

BRIEF DESCRIPTION OF THE DRAWINGS

FIG. 4 is a table for describing operation of the downconverter according to the first embodiment;

FIG. 5 is a view for describing a Tone/Pola signal for use in the downconverter according to the first embodiment;

FIG. 12 is a table for describing an operation of the downconverter shown in FIG. 9;

FIG. 13 is a table for describing another operation of the downconverter shown in FIG. 9.

DETAILED DESCRIPTION

Embodiments of the invention are described hereinafter with reference to the accompanying drawings.

First Embodiment

Figure 1:
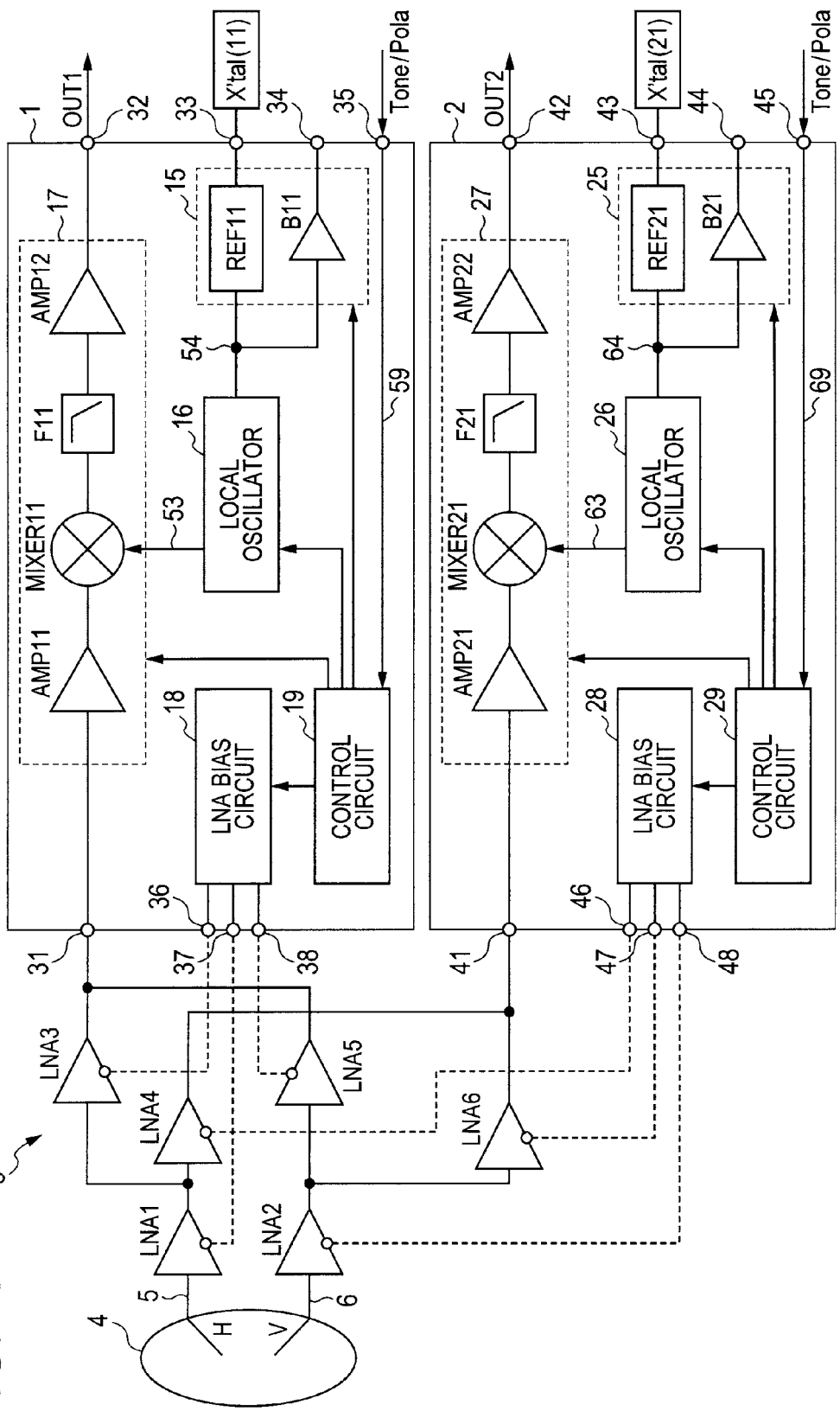
FIG. 1 is a block diagram showing a downconverter according to a first embodiment of the invention.

FIG. 1 is a block diagram showing a downconverter according to a first embodiment of the invention. The downconverter shown in FIG. 1 is a downconverter of the universal dual configuration capable of outputting two intermediate frequency signals, in the specification of, for example, Dis-Eqc (Digital Satellite Equipment Control). More specifically, with the downconverter shown in FIG. 1, a horizontally polarized wave signal (H) 5 and a vertically polarized wave signal (V) 6 are received by one parabola antenna 4, and intermediate frequency signals OUT1, OUT2, after down-conversion are outputted from downconverter circuits 1, 2, respectively.

The downconverter shown in FIG. 1 is provided with an amplification unit 3, the downconverter circuit 1, and the downconverter circuit 2. In this case, the downconverter circuits 1, 2 each are formed in, for example, one IC chip. That is, the downconverter of the universal dual configuration capable of outputting the two intermediate frequency signals can be made up of two IC chips (the downconverter circuits).

The amplification unit 3 includes a plurality of amplifiers {low noise amplifiers (LNA: Low Noise Amplifier)} for amplifying a horizontally polarized wave signal 5, and a vertically polarized wave signal 6, received by a parabola antenna 4, respectively. Herein, for each of the LNAs, use can be made of, for example, a high electron mobility transistor (HEMT).

The horizontally polarized wave signal 5 received by the parabola antenna 4 is amplified by the LNA 1 (a first amplifier) to be outputted to the LNA 3 (a third amplifier), and the LNA 4 (a fourth amplifier). The LNA 3 amplifies the horizontally polarized wave signal amplified by the LNA 1 to be outputted to an input terminal 31 of the downconverter circuit 1. The LNA 4 amplifies the horizontally polarized wave signal amplified by the LNA 1 to be outputted to an input terminal 41 of the downconverter circuit 2.

The vertically polarized wave signal 6 received by the parabola antenna 4 is amplified by the LNA 2 (a second amplifier) to be outputted to the LNA 5 (a fifth amplifier), and the LNA 6 (a sixth amplifier). The LNA 5 amplifies the vertically polarized wave signal amplified by the LNA 2 to be outputted to the input terminal 31 of the downconverter circuit 1. The LNA 6 amplifies the vertically polarized wave signal amplified by the LNA 2 to be outputted to the input terminal 41 of the downconverter circuit 2.

More specifically, the horizontally polarized wave signal 5 is supplied to the input terminal 31 of the downconverter circuit 1 via the LNA 1 and the LNA 3 while the vertically polarized wave signal 6 is supplied to the input terminal 31 of the downconverter circuit 1 via the LNA 2 and the LNA 5. Further, the horizontally polarized wave signal 5 is supplied to the input terminal 41 of the downconverter circuit 2 via the LNA 1 and the LNA 4 while the vertically polarized wave signal 6 is supplied to the input terminal 41 of the downconverter circuit 2 via the LNA 2 and the LNA 6.

The downconverter circuit 1 (a first downconverter circuit) includes a reference signal generator 15 (a first reference signal generator), a local oscillator 16 (a first local oscillator), a frequency converter 17 (a first frequency converter), an LNA bias circuit 18 (a first bias circuit), and a control circuit 19 (a first control circuit).

The reference signal generator 15 includes a crystal oscillation circuit REF11, and a buffer B11. The crystal oscillation circuit REF11 generates a reference signal 54 (a first reference signal) having a predetermined reference frequency, outputting the reference signal 54 to the local oscillator 16. In this connection, the crystal oscillation circuit REF11 generates the reference signal 54 by making use of a quartz resonator X'tal (11) coupled to a terminal 33. The local oscillator 16 generates a local oscillation frequency signal 53 by use of the reference signal 54.

The frequency converter 17 is provided with a preamp AMP11, a mixer MIXER 11, a lowpass filter F11, and an IF amp AMP12. The preamp AMP11 amplifies the horizontally polarized wave signal or the vertically polarized wave signal, inputted to the input terminal 31, to be outputted to the mixer MIXER 11. The mixer MIXER 11 down-converts an amplified horizontally polarized wave signal or an amplified vertically polarized wave signal, outputted from the preamp AMP11, by use of the local oscillation frequency signal 53 outputted from the local oscillator 16. The down-converted horizontally polarized wave signal or a down-converted vertically polarized wave signal, an unnecessary component thereof being removed by the filter F11, is further amplified by the IF amp AMP12 to be outputted as the intermediate frequency signal OUT1 from an output terminal 32.

The LNA bias circuit 18 supplies the LNA 1 with power via a terminal 37, supplies the LNA 3 with power via a terminal 36, and supplies the LNA 5 with power via a terminal 38. The control circuit 19 controls the reference signal generator 15, the local oscillator 16, the frequency converter 17, and the LNA bias circuit 18 in accordance with a Tone/Pola signal 59 inputted from a control signal input terminal 35.

The downconverter circuit 2 (a second downconverter circuit) includes a reference signal generator 25 (a second reference signal generator), a local oscillator 26 (a second local oscillator), a frequency converter 27, an LNA bias circuit 28 (a second LNA bias circuit), and a control circuit 29 (a second control circuit). The reference signal generator 25 includes a crystal oscillation circuit REF21 and a buffer B21.

The crystal oscillation circuit REF21 generates a reference signal 64 (a second reference signal) having a predetermined reference frequency, outputting the reference signal 64 to the local oscillator 26. In this connection, the crystal oscillation circuit REF21 generates a reference signal 64 by making use of a quartz resonator X'tal (21) coupled to a terminal 43. The reference signal 64 is typically identical in frequency to the reference signal 54. The local oscillator 26 generates a local oscillation frequency signal 63 by use of the reference signal 64.

The frequency converter 27 is provided with a preamp AMP21, a mixer MIXER 21, a lowpass filter F21, and an IF amp AMP22. The preamp AMP21 amplifies the horizontally polarized wave signal or the vertically polarized wave signal, inputted to input terminal 41, to be outputted to the mixer MIXER 21. The mixer MIXER 21 down-converts an amplified horizontally polarized wave signal or an amplified vertically polarized wave signal, outputted from the preamp AMP 21, by making use of the local oscillation frequency signal 63 outputted from the local oscillator 26. The down-converted horizontally polarized wave signal or a down-converted vertically polarized wave signal, an unnecessary component thereof being removed by the filter F21, is further amplified by the IF amp AMP22 to be outputted as the intermediate frequency signal OUT2 from an output terminal 42.

The LNA bias circuit 28 supplies an LNA 2 with power via a terminal 48, supplies an LNA 4 with power via a terminal 46, and supplies an LNA 6 with power via a terminal 47. The control circuit 29 controls the reference signal generator 25, the local oscillator 26, the frequency converter 27, and the LNA bias circuit 28 in accordance with a Tone/Pola signal 69 inputted from a control signal input terminal 45.

Figure 2:
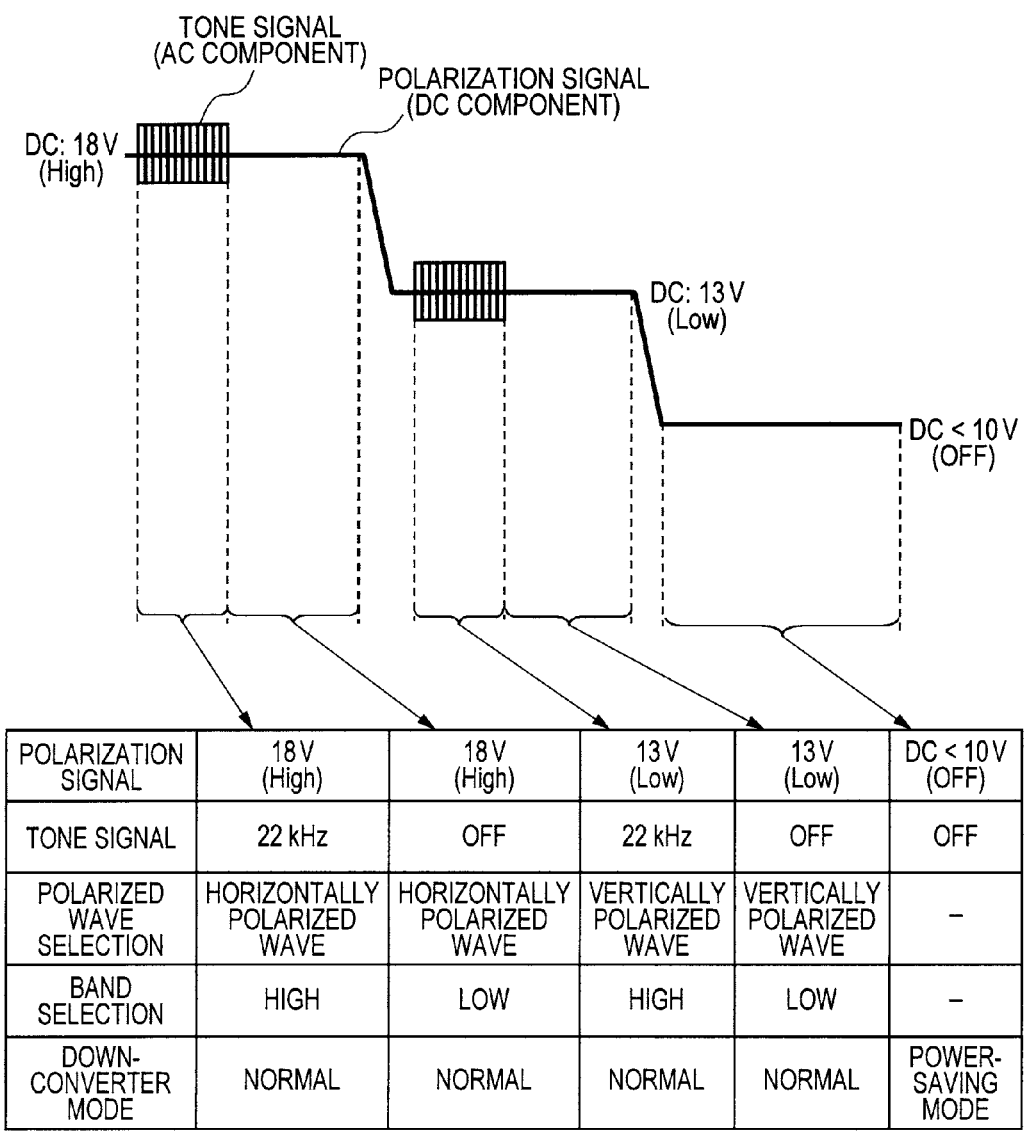
FIG. 2 is a view for describing the case of supplying the downconverter according to the first embodiment with power, and a Tone/Pola signal.

FIG. 2 is a view showing one example of a Tone/Pola signal for use in the downconverter according to the present embodiment. As shown in FIG. 2, the Pola (Polarization) signal is, for example, a DC voltage signal at 18V, a DC voltage signal at 13V, or a DC voltage signal below 10V. Herein, the case where the DC voltage signal below 10V is supplied typically refers to the case where the Pola signal is not supplied, that is, the case where the DC voltage of the Pola signal is not energized. In other words, the case where the DC voltage signal below 10V is supplied is the case where a DC component is not supplied from a tuner shown in FIG. 3 to the downconverter circuit. In the case where the DC component is not supplied from the tuner shown in FIG. 3 to the down-converter circuit, a voltage detected at the control signal input terminal 35 via resistors R11, R12 is ideally 0V. There is described hereinafter the case where the Pola signal is not supplied, as a representative example of the case where the DC voltage signal below 10V is supplied.

If the Pola signal (a first mode select signal) is the DC voltage signal at 18V, the control circuit 19 controls the LNA bias circuit 18 such that the horizontally polarized wave signal is supplied to the input terminal 31 of the downconverter circuit 1. If the Pola signal is the DC voltage signal at 13V, the control circuit 19 controls the LNA bias circuit 18 such that the vertically polarized wave signal is supplied to the input terminal 31 of the downconverter circuit 1. At this time, an operation mode of the downconverter circuit 1 is a normal operation mode. On the other hand, if the Pola signal is not supplied, the downconverter circuit 1 is turned into a power-saving mode. If the downconverter circuit 1 is in the power-saving mode, the control circuit 19 causes both the local oscillator 16 and the frequency converter 17 to be in a non-operating state, keeping the LNA bias circuit 18 and the crystal oscillation circuit REF11 inside the reference signal generator 15 in an operating state. Since the buffer B11 in the reference signal generator 15 is a circuit that outputs signals generated by the crystal oscillation circuit REF11 to outside, the buffer B11 is always kept in a non-operating state for the configuration shown in FIG. 2.

Further, if the Pola signal (a second mode select signal) is the DC voltage signal at 18V, the control circuit 29 controls the LNA bias circuit 28 such that the horizontally polarized wave signal is supplied to the input terminal 41 of the downconverter circuit 2. If the Pola signal is the DC voltage signal at 13V, the control circuit 29 controls the LNA bias circuit 28 such that the vertically polarized wave signal is supplied to the input terminal 41 of the downconverter circuit 2. At this time, an operation mode of the downconverter circuit 2 is the normal operation mode. On the other hand, if the Pola signal is not supplied, the downconverter circuit 2 is turned into the power-saving mode. If the downconverter circuit 2 is in the power-saving mode, the control circuit 29 causes both the local oscillator 26 and the frequency converter 27 to be in the non-operating state, keeping the LNA bias circuit 28 and the crystal oscillation circuit REF21 inside the reference signal generator 25 in the operating state. The buffer B21 is also always kept in a non-operating state for the configuration shown in FIG. 2

As shown in FIG. 2, a Tone signal is a signal of an AC component (22 kHz), and is superimposed on the Pola signal representing the DC component. In the case where the Tone signal (a first band-select signal) at 22 kHz is supplied as the AC component of the Tone/Pola signal, the control circuit 19 controls the local oscillator 16 such that the local oscillation frequency signal 53 in a high band (for example, 10.6 GHz in the case of Ku band) can be outputted. On the other hand, if the AC component of the Tone/Pola signal is in the OFF state, the control circuit 19 controls the local oscillator 16 such that the local oscillation frequency signal 53 in a low band (for example, 9.75 GHz in the case of Ku band) can be outputted.

Similarly, in the case where the Tone signal (a second band-select signal) at 22 kHz is supplied as the AC component of the Tone/Pola signal, the control circuit 29 controls the local oscillator 26 such that the local oscillation frequency signal 63 in a high band (for example, 10.6 GHz) can be outputted. On the other hand, if the AC component of the Tone/Pola signal is in the OFF state, the control circuit 29 controls the local oscillator 26 such that the local oscillation frequency signal 63 in a low band (for example, 9.75 GHz) can be outputted.

Figure 9:
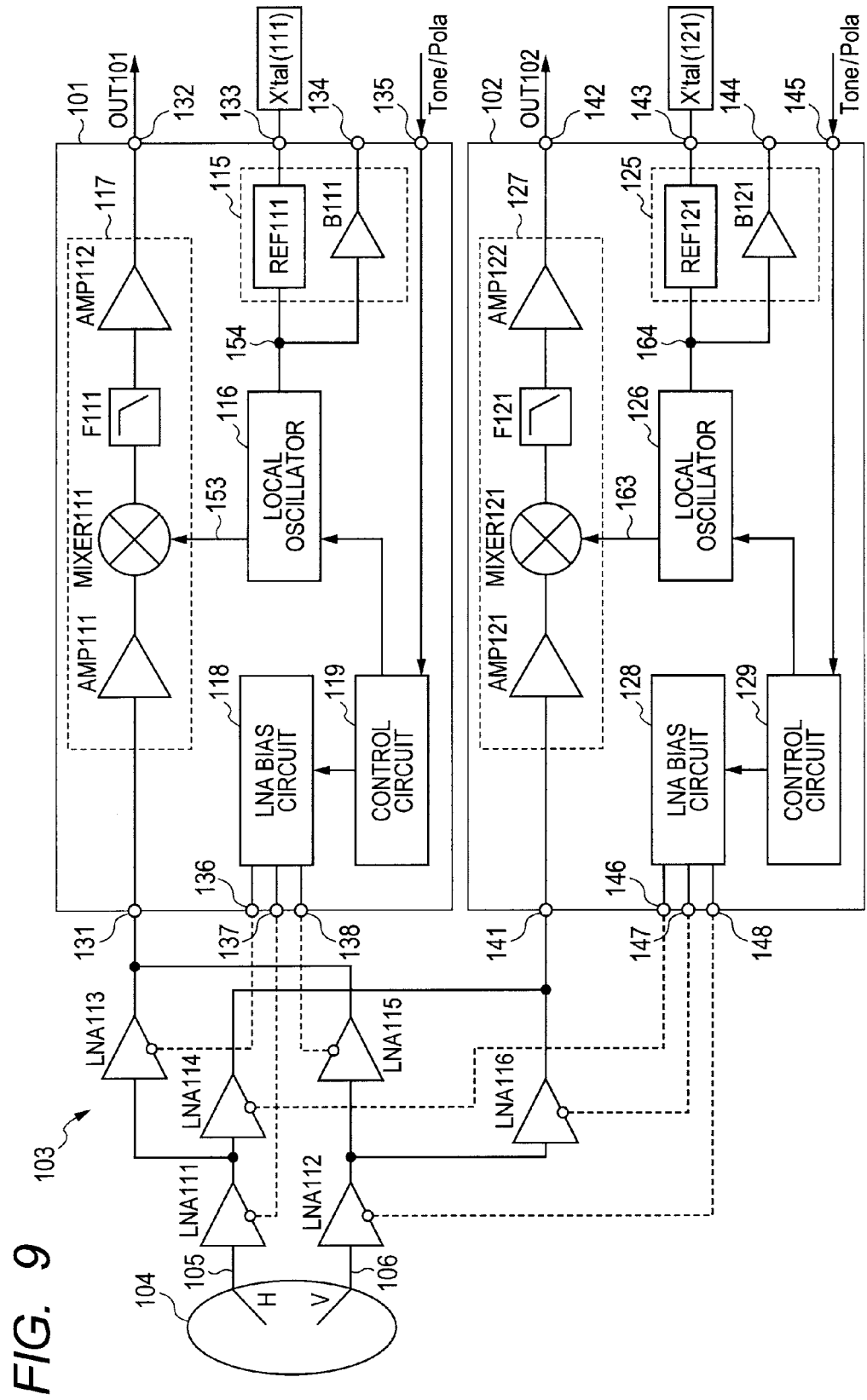
FIG. 9 is a view for use in describing a problem to be solved by the invention.
Figure 10:
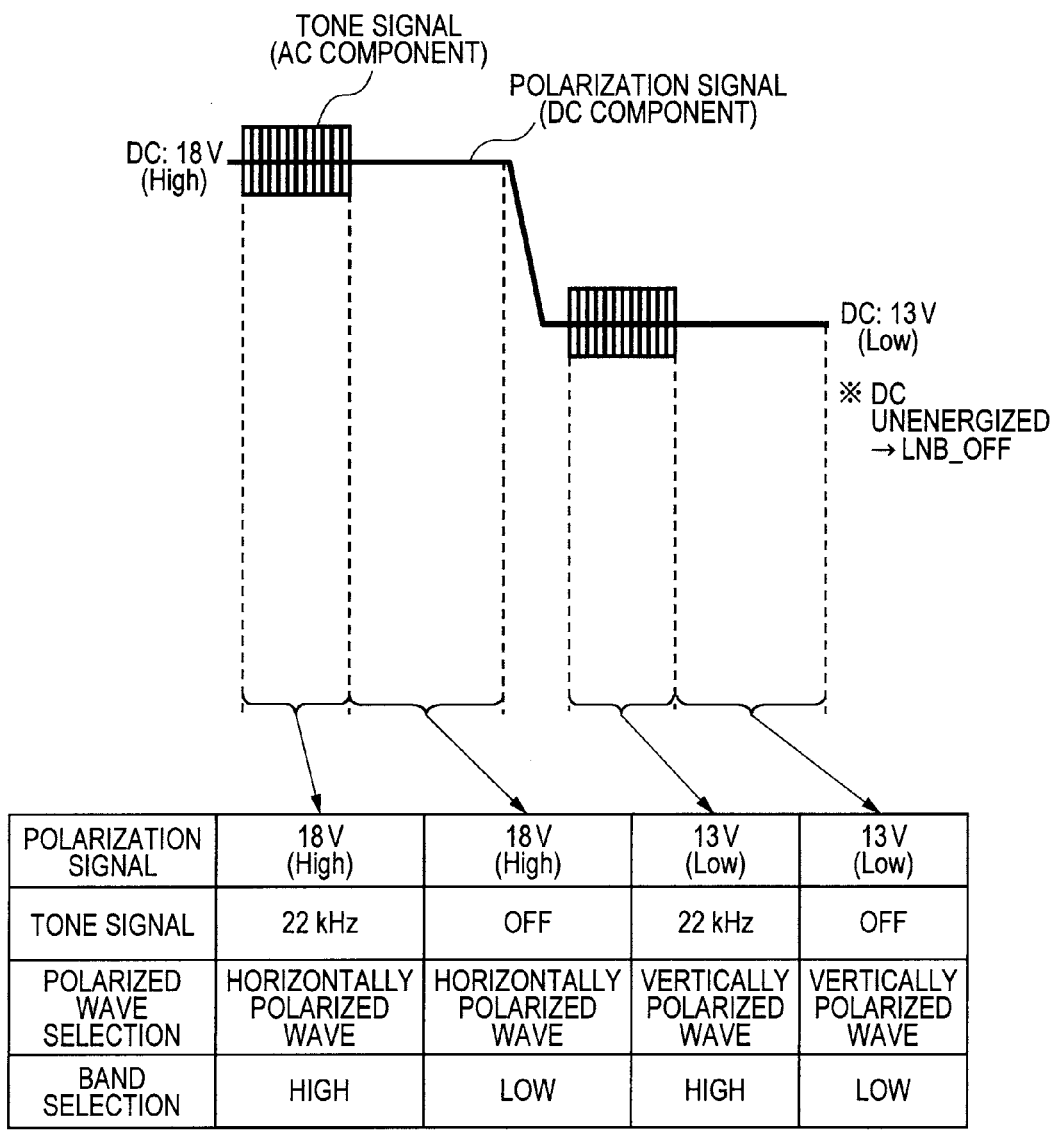
FIG. 10 is a view for describing a Tone/Pola signal for use in a downconverter shown in FIG. 9.
Figure 11:
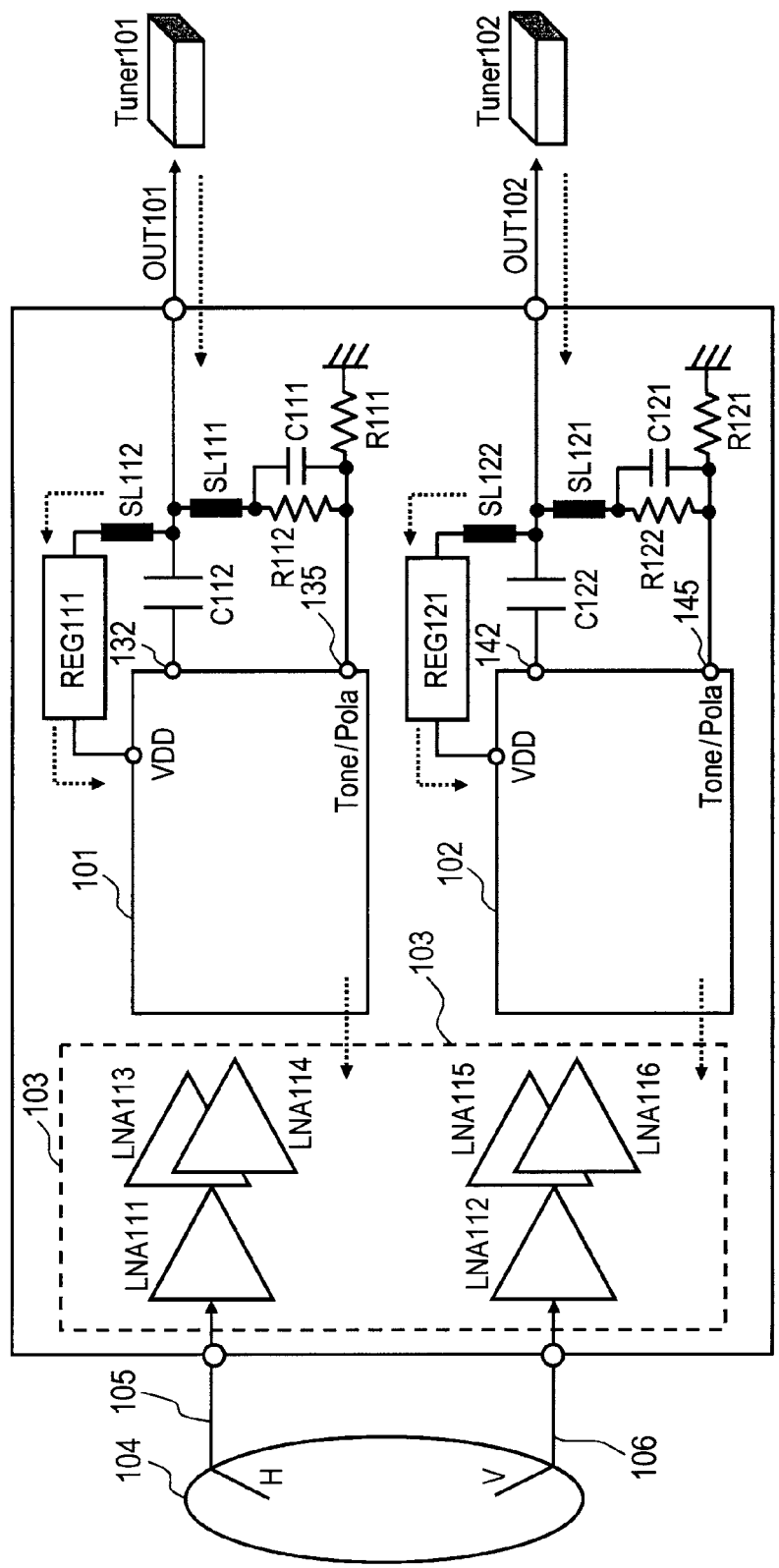
FIG. 11 is a view for describing the case of supplying the downconverter shown in FIG. 9 with power, and a Tone/Pola signal.
Figure 14:
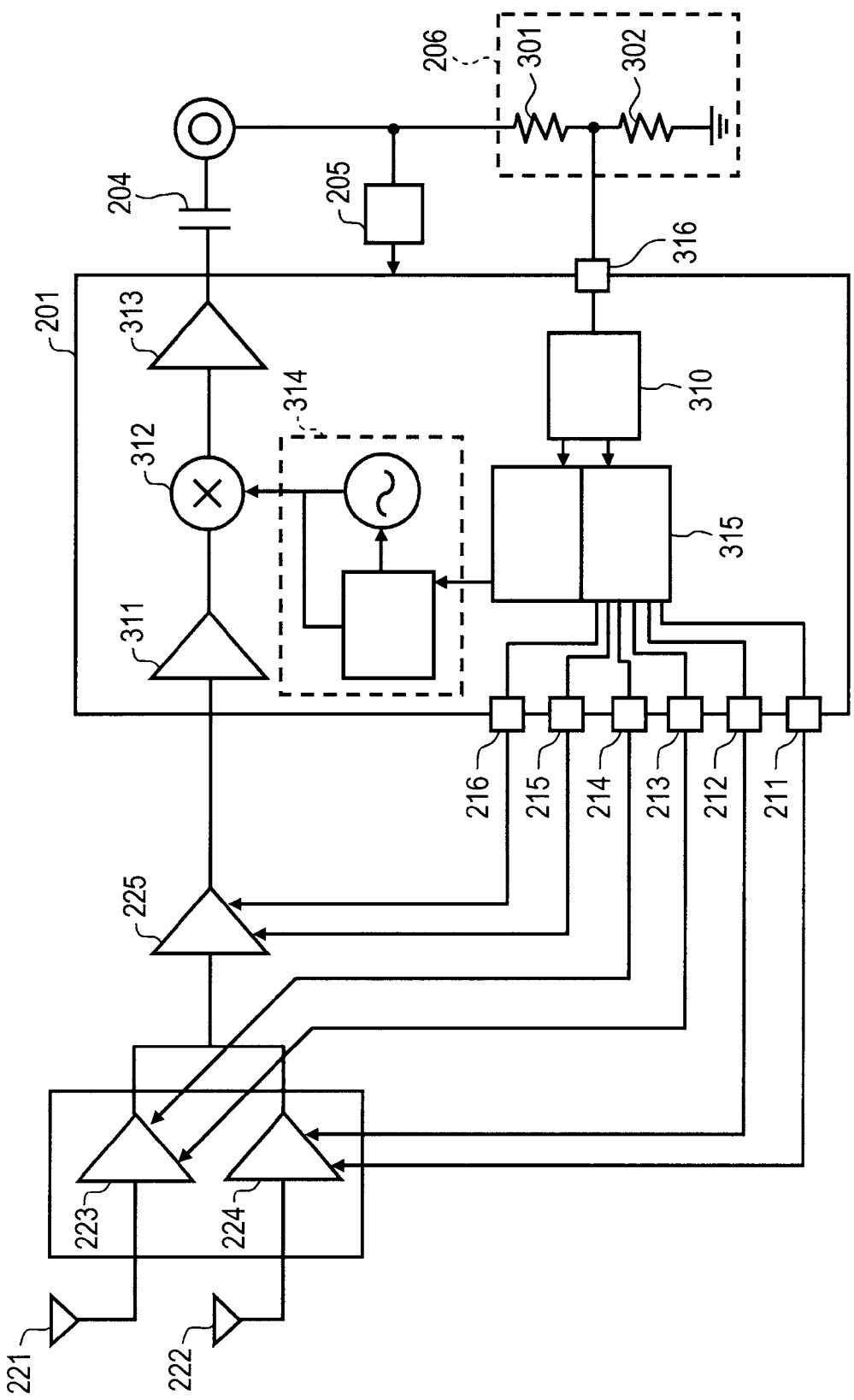
FIG. 14 is a block diagram for describing a downconverter disclosed in Patent Document 1.

With the downconverter shown in FIG. 9, only the DC voltage signal at 18V and the DC voltage signal at 13V are used. In contrast, with the downconverter according to the present embodiment, the power-saving mode is newly set in the case of the DC voltage signal below 10V (typically if the Pola signal is not supplied) while the DC voltage signal at 18V and the DC voltage signal at 13V are being used. More specifically, with the downconverter according to the present embodiment, if the Pola signal is represented in two bits, the control circuits 119, 129 each can detect three states of operation including (1) the case where the horizontally polarized wave signal is supplied (the normal operation mode), (2) the case where the vertically polarized wave signal is supplied (the normal operation mode), and (3) the power-saving mode.

Figure 6:
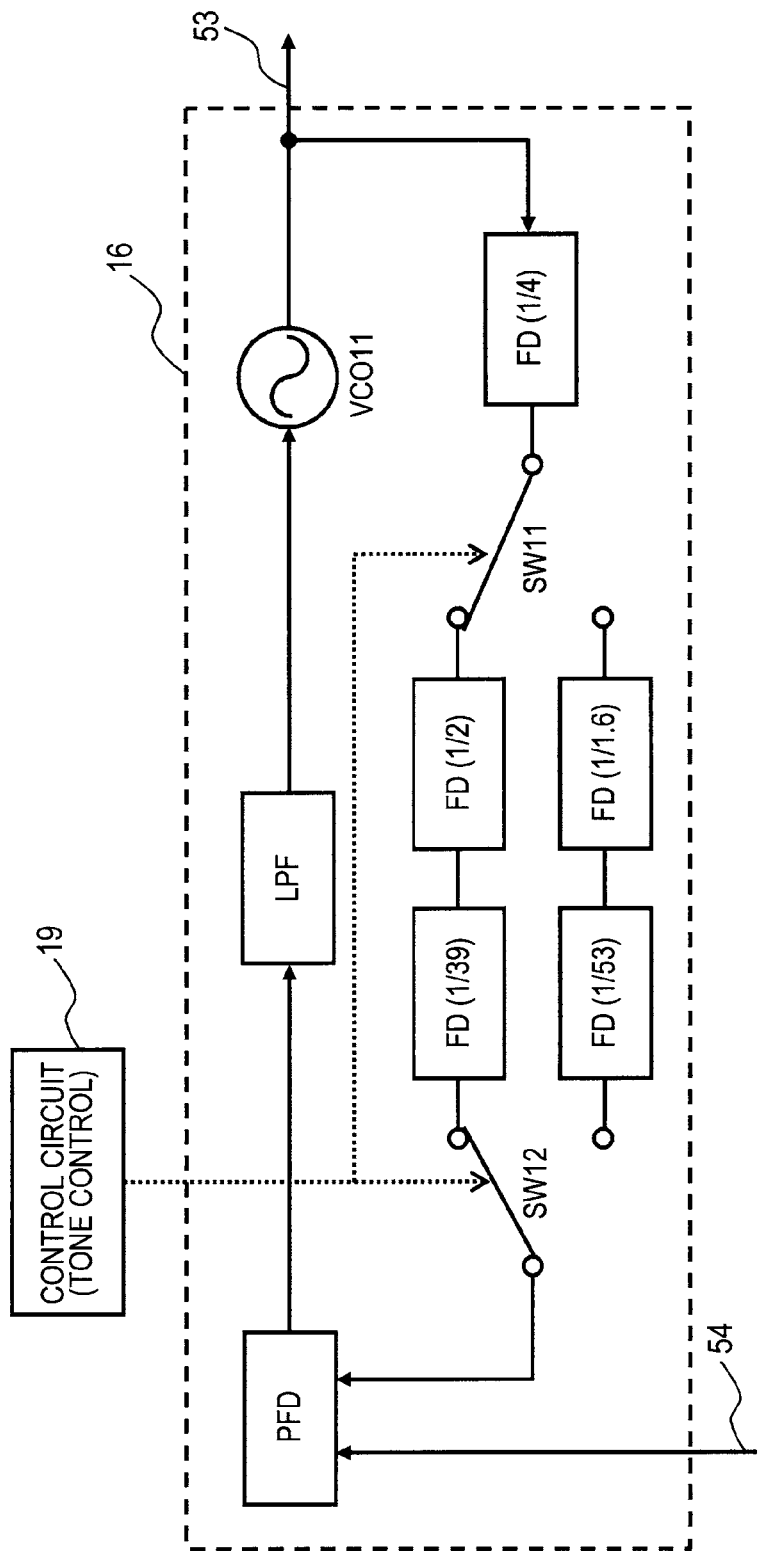
FIG. 6 is a block diagram showing an example of a local oscillator of the downconverter according to the first embodiment.

FIG. 6 is a block diagram showing an example of the local oscillator 16 of the downconverter according to the present embodiment (the same applies to the local oscillator 26). As shown in FIG. 6, the local oscillator 16 is provided with a phase comparator PFD, a lowpass filter LPF, a voltage control oscillator VCO11, and a plurality of frequency dividers FDs.

The phase comparator PFD receives the reference signal 54 generated by the crystal oscillation circuit REF11 and a signal subjected to frequency division by the frequency dividers FDs, outputting a signal obtained by converting a phase difference between those signals into a voltage. The lowpass filter LPF removes an unnecessary component of the signal outputted from the phase comparator PFD. The voltage control oscillator VCO11 controls the frequency of an output signal according to a voltage of a signal outputted from the lowpass filter LPF. An output signal generated by the voltage control oscillator VCO11 is outputted as the local oscillation frequency signal 53.

Further, the local oscillation frequency signal 53 outputted from the voltage control oscillator VCO11 undergoes frequency division by a first path passing through the frequency divider FD (1/4), the frequency divider FD (1/2), and the frequency divider FD (1/39), or a second path passing through the frequency divider FD (1/4), the frequency divider FD (1/1.6), and the frequency divider FD (1/53). Switching between the first path and the second path can be executed by turning both switches SW11 and SW12 ON or OFF with the use of the control signal outputted from the control circuit 19.

In the case of the frequency of the reference signal 54 being 31.25 MHz, the local oscillation frequency signal (low band) 53 at 10.6 GHz (=31.25 MHz×4×2×39) can be generated by the control circuit 19 selecting the first path. On the other hand, if the control circuit 19 selects the second path, the local oscillation frequency signal (high band) 53 at 9.75 GHz (=31.25 MHz×4×1.6×53) can be generated.

Figure 7:
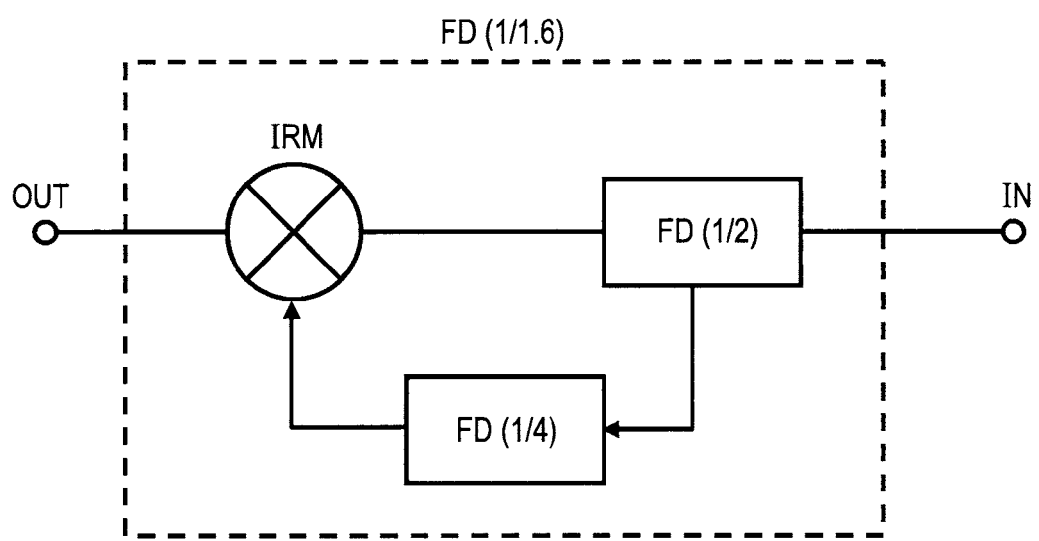
FIG. 7 is a block diagram showing an example of a 1/1.6 frequency divider.

Herein, the frequency divider FD (1/1.6) can be made up by use of the frequency divider FD (1/2), the frequency divider FD (1/4), and an image rejection mixer IRM, as shown in, for example, FIG. 7.

Figure 3:
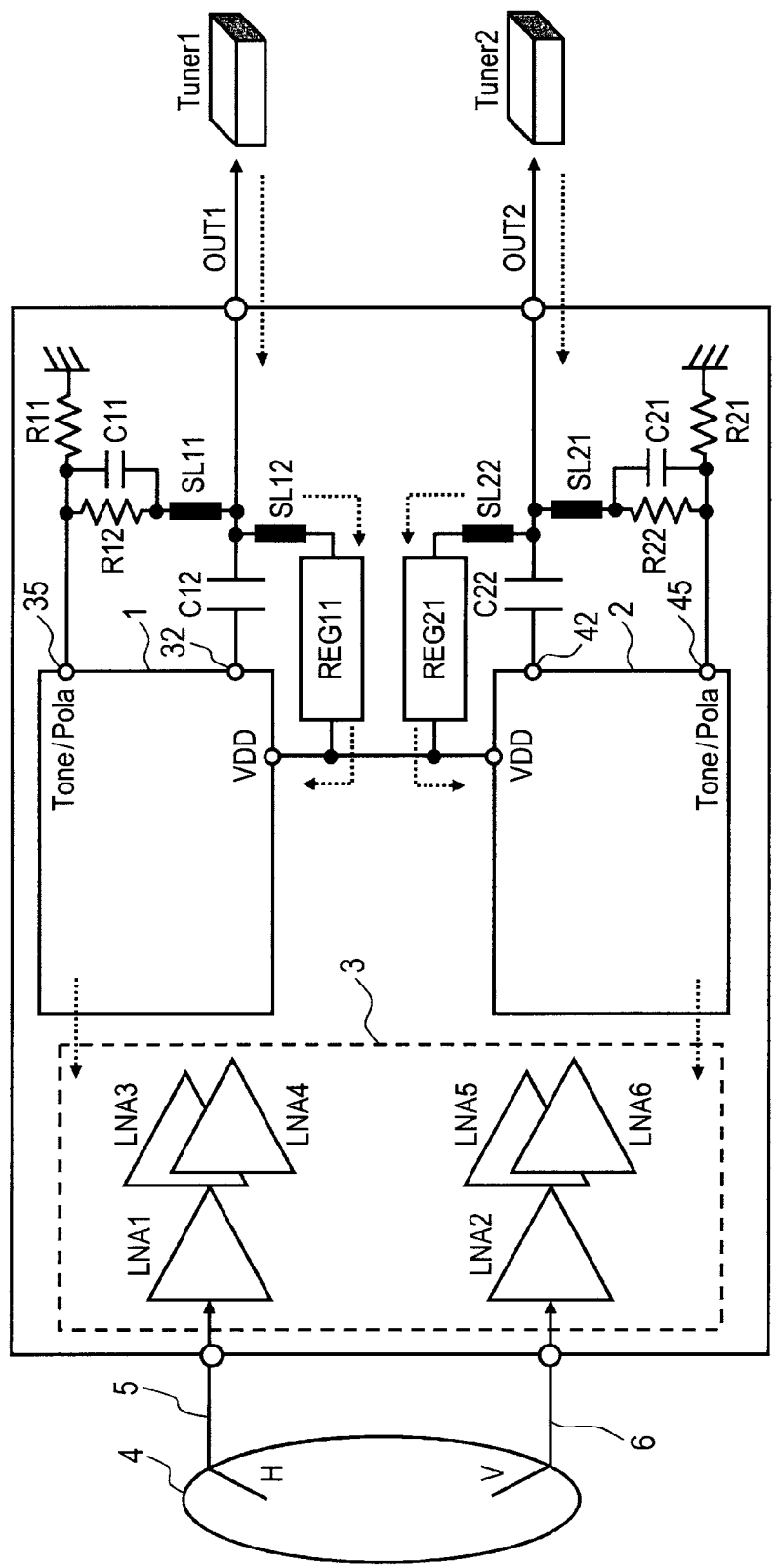
FIG. 3 is a block diagram for describing operation of the downconverter according to the first embodiment.

FIG. 3 is a view for describing the case of supplying the downconverter shown in FIG. 1 with power, and a Tone/Pola signal. The intermediate frequency signal OUT1 subjected to down-conversion in the downconverter circuit 1, the DC component thereof being removed by a capacitor C12, is supplied to a tuner (Tuner 1: a first tuner) via a cable. Meanwhile, the tuner (Tuner 1) supplies the downconverter circuit 1 with power and a Tone/Pola signal via the same cable as used in the transmission of the intermediate frequency signal OUT1. Herein, the downconverter circuit 1 is supplied with a DC component of the Tone/Pola signal {a DC voltage signal at 18V, a DC voltage signal at 13V, or a DC voltage signal below 10V (typically at 0V, in which case, the DC component is not energized)}, the DC component serving as the power.

The DC component (13V or 18V) of the Tone/Pola signal is supplied to a regulator REG11 (a first regulator) via a strip line SL12. The regulator REG11 adjusts a voltage at 13V or 18V to a voltage matching the maximum rating of the downconverter circuit 1 to be subsequently supplied to a power supply terminal VDD of the downconverter circuit 1.

Further, the Tone/Pola signal is supplied to a resistor R12 and a capacitor C11 via a strip line SL11. Herein, the DC component of the Pola signal is divided by the agency of the resistor R11 and the resistor R12. More specifically, the Pola signal is reduced to a voltage matching the maximum rating of the downconverter circuit 1 by use of the resistor R11 and the resistor R12 to be delivered to the control signal input terminal 35. On the other hand, the Tone signal passes through the capacitor C11, and the presence or absence of a pulse is checked inside the downconverter circuit 1. Further, the power is supplied to the LNA1, LNA3 and LNA5, provided in the amplification unit 3, via the LNA bias circuit 18.

Similarly, the intermediate frequency signal OUT2 subjected to down-conversion in the downconverter circuit 2, the DC component thereof being removed by a capacitor C22, is supplied to a tuner (Tuner 2: a second tuner) via a cable. Meanwhile, the tuner (Tuner 2) supplies the downconverter circuit 2 with power and a Tone/Pola signal via the same cable as used in the transmission of the intermediate frequency signal OUT2. Herein, the downconverter circuit 2 is supplied with the DC component of the Tone/Pola signal {the DC voltage signal at 18V, the DC voltage signal at 13V, or the DC voltage signal below 10V (typically at 0V, in which case, the DC component is not energized)}, the DC component serving as the power.

The DC component (13V or 18V) of the Tone/Pola signal is supplied to a regulator REG21 (a second regulator) via a strip line SL22. The regulator REG21 adjusts the voltage at 13V or 18V to a voltage matching the maximum rating of the downconverter circuit 2 to be subsequently supplied to a power supply terminal VDD of the downconverter circuit 2.

Further, the Tone/Pola signal is supplied to a resistor R22 and a capacitor C21 via a strip line SL21. Herein, the DC component of the Pola signal is divided by the agency of the resistor R21 and the resistor R22. More specifically, the Pola signal is reduced to a voltage matching the maximum rating of the downconverter circuit 2 by use of the resistor R21 and the resistor R22 to be delivered to the control signal input terminal 45. On the other hand, the Tone signal passes through the capacitor C21, and the presence or absence of a pulse is checked inside the downconverter circuit 2. Further, the power is supplied to the LNA2, LNA 4 and LNA 6 provided in the amplification unit 3 via the LNA bias circuit 28.

Now, in the downconverter according to the present embodiment, the power can be supplied from the regulator REG11 to the power supply terminal VDD of the downconverter circuit 2 as well. Further, the power can be supplied from the regulator REG21 to the power supply terminal VDD of the downconverter circuit 1 as well. That is, in the downconverter according to the present embodiment, if the power is not supplied to the downconverter circuit 1, in other words, if the Tone/Pola signal is not supplied to the downconverter circuit 1, the power cannot be supplied from the regulator REG11 to the power supply terminal VDD of the downconverter circuit 1. In this case, however, since the power is supplied to the downconverter circuit 2 (that is, the DC component (13V or 18V) of the Tone/Pola signal, serving as the power, is supplied to the downconverter circuit 2), the power can be supplied from the regulator REG21 to the power supply terminal VDD of the downconverter circuit 1.

Similarly, if the power is not supplied to the downconverter circuit 2, that is, if the Tone/Pola signal is not supplied to the downconverter circuit 2, the power cannot be supplied from the regulator REG21 to the power supply terminal VDD of the downconverter circuit 2. In this case, however, since the power is supplied to the downconverter circuit 1 (that is, the DC component (13 V or 18 V) of the Tone/Pola signal, serving as the power, is supplied to the downconverter circuit 1), the power can be supplied from the regulator REG11 to the power supply terminal VDD of the downconverter circuit 2.

FIG. 4 is a table for describing an operation of the downconverter shown in FIG. 1. If the intermediate frequency signals OUT1, OUT2 are not outputted, the power is not supplied from the tuner (Tuner 1, Tuner 2) to the downconverter circuits 1, 2, respectively, so that the downconverter circuits 1, 2 are turned OFF. As a result, the LNAs 1 to 6 are also turned OFF.

On the other hand, if the intermediate frequency signals OUT1, OUT2 are outputted, the horizontally polarized wave signal 5 is supplied to the downconverter circuit 1 via the LNA 1 and the LNA 3, or the vertically polarized wave signal 6 is supplied to the downconverter circuit 1 via the LNA 2 and the LNA 5. Further, the horizontally polarized wave signal 5 is supplied to the downconverter circuit 2 via the LNA 1 and the LNA 4, or the vertically polarized wave signal 6 is supplied to the downconverter circuit 2 via the LNA 2 and the LNA 6. In this case, the LNA 1 and the LNA 2 are in the ON state at all times.

Further, if the Pola signal is High (18V), the LNA 3 is turned ON and the LNA5 is turned OFF, whereupon the horizontally polarized wave signal 5 is supplied to the downconverter circuit 1. On the other hand, if the Pola signal is Low (13V), the LNA 3 is turned OFF and the LNA 5 is turned ON, whereupon the vertically polarized wave signal 6 is supplied to the downconverter circuit 1. As for the LNA 1, the LNA 3, and the LNA 5, respectively, switching between the ON state and the OFF state thereof can be executed by switching between the presence and the absence of power supply from the LNA bias circuit 18. Further, the presence and the absence of the power supply from the LNA bias circuit 18 is controlled by a control signal inputted from the control circuit 19.

Similarly, if the Pola signal is High (18V), the LNA 4 is turned ON and the LNA 6 is turned OFF, whereupon the horizontally polarized wave signal 5 is supplied to the downconverter circuit 2. On the other hand, if the Pola signal is Low (13V), the LNA 4 is turned OFF and the LNA 6 is turned ON, whereupon the vertically polarized wave signal 6 is supplied to the downconverter circuit 2. As for the LNA 2, the LNA 4, and the LNA 6, respectively, switching between the ON state and the OFF state thereof can be executed by switching between the presence and the absence of power supply from the LNA bias circuit 28. Further, the presence and the absence of the power supply from the LNA bias circuit 28 is controlled by a control signal inputted from the control circuit 29.

Further, as shown in FIG. 4, if the Tone signal is in the OFF state, a signal in the low band (9.75 GHz) is outputted as the local oscillation frequency signals 53, 63, respectively. On the other hand, if Tone signal at 22 kHz is superimposed, a signal in the high band (10.6 GHz) is outputted as the local oscillation frequency signals 53, 63, respectively. Further, if the intermediate frequency signals OUT1, OUT2 are outputted, the power is supplied from the tuners (Tuner 1, Tuner 2) to the downconverter circuits 1, 2, respectively.

Next, referring to FIG. 5, there is described hereinafter the case where only the intermediate frequency signal OUT1, or the intermediate frequency signal OUT2 is outputted. If only one of the intermediate frequency signals is outputted, the downconverter circuit where the other of the intermediate frequency signals is not outputted is turned OFF. By so doing, power consumption of the downconverter can be reduced.

First, there is described hereinafter the case where the intermediate frequency signal OUT1 is outputted while the intermediate frequency signal OUT2 is not outputted (OUT1 is ON and OUT2 is OFF). In this case, the downconverter circuit 2 is in the power-saving mode, so that the control circuit 29 causes the reference signal generator 25, the local oscillator 26, and the frequency converter 27 to be in a non-operating state, controlling the LNA bias circuit 28 such that the power is supplied to the LNA 2. In this case, the power is supplied from the regulator REG11 to the downconverter circuit 2.

When the LNA 1 and the LNA 3 each are in the ON state, the horizontally polarized wave signal 5 is supplied to the downconverter circuit 1. On the one hand, when the LNA 2 and the LNA 5 each are in the ON state, the vertically polarized wave signal 6 is supplied to the downconverter circuit 1. Further, if the Tone signal is in the OFF state, the signal in the low band (9.75 GHz) is outputted as the local oscillation frequency signal 53. On the other hand, if Tone signal at 22 kHz is superimposed, the signal in the high band (10.6 GHz) is outputted as the local oscillation frequency signals 53.

Next, there is described hereinafter the case where the intermediate frequency signal OUT2 is outputted while the intermediate frequency signal OUT1 is not outputted (OUT1 is OFF and OUT2 is ON). In this case, the downconverter circuit 1 is in the power-saving mode, so that the control circuit 19 causes the reference signal generator 15, the local oscillator 16, and the frequency converter 17 to be in the non-operating state, controlling the LNA bias circuit 18 such that the power is supplied to the LNA1. In this case, the power is supplied from the regulator REG21 to the downconverter circuit 1.

When the LNA 1 and the LNA 4 each are in the ON state, the horizontally polarized wave signal 5 is supplied to the downconverter circuit 2. On the other hand, when the LNA 2 and the LNA 6 each are in the ON state, the vertically polarized wave signal 6 is supplied to the downconverter circuit 1. Further, if the Tone signal is in the OFF state, the signal in the low band (9.75 GHz) is outputted as the local oscillation frequency signal 63. On the other hand, if Tone signal at 22 kHz is superimposed, the signal in the high band (10.6 GHz) is outputted as the local oscillation frequency signals 63.

With the downconverter shown in FIG. 9, the power has been supplied to the LNA 112 by use of the LNA bias circuit 128 of the downconverter circuit 102. For this reason, if the downconverter circuit 102 is turned OFF, the LNA bias circuit 128 is also turned OFF, thereby interrupting power supply to the LNA 112 as well, so that it has been impossible to output the vertically polarized wave signal 106 to the downconverter circuit 101. Further, with the downconverter shown in FIG. 9, the power has been supplied to the LNA 111 by use of the LNA bias circuit 118 of the downconverter circuit 101. For this reason, if the downconverter circuit 101 is turned OFF, the LNA bias circuit 118 is also turned OFF, thereby interrupting power supply to the LNA 111 as well, so that it has been impossible to output the horizontally polarized wave signal 105 to the downconverter circuit 102.

Thus, in the case where the universal dual downconverter is made up by use of the downconverter IC disclosed in Patent Document 1, a problem has been encountered in that if either one of the downconverter circuits (101 or 102) is turned OFF, the downconverter is not normally operated. Accordingly, the downconverter IC disclosed in Patent Document 1 has been applicable only to the case of a universal single configuration.

Furthermore, if the downconverter IC disclosed in Patent Document 1 is applied to a universal dual downconverter, it has been necessary to supply the LNA with power by use of another power supply source. In this case, there has arisen a problem in that an increase in both power consumption and cost has resulted and the specification of a downconverter becomes complicated.

In contrast, with the downconverter according to the present embodiment shown in FIG. 1, the power-saving mode is newly set in the case of the DC voltage signal below 10 V (typically, if the Pola signal is not supplied) while the DC voltage signal at 18 V and the DC voltage signal at 13 V are being used. More specifically, with the downconverter according to the present embodiment, if the Pola signal is represented in two bits, the control circuits 19, 29 each can detect the three states of operation including (1) the case where the horizontally polarized wave signal is supplied (the normal operation mode), (2) the case where the vertically polarized wave signal is supplied (the normal operation mode), and (3) the power-saving mode.

Then, if the control signal (the Pola signal) is the signal indicating the power-saving mode, the control circuit 19 causes both the local oscillator 16 and the frequency converter 17 to be in the non-operating state, controlling the LNA bias circuit 18 such that the power is supplied to the LNA 1. Further, if the control signal (the Pola signal) is the signal indicating the power-saving mode, the control circuit 29 causes both the local oscillator 26 and the frequency converter 27 to be in the non-operating state, controlling the LNA bias circuit 28 such that the power is supplied to the LNA 2. Accordingly, even if the downconverter circuit 1 is in the power-saving mode, the LNA 1 can be turned ON, so that the horizontally polarized wave signal 5 can be supplied to the downconverter circuit 2. Further, even if the downconverter circuit 2 is in the power-saving mode, the LNA 2 can be turned ON, so that the vertically polarized wave signal 6 can be supplied to the downconverter circuit 1.

Furthermore, with the downconverter according to the present embodiment, the power can be supplied from the regulator REG11 to the power supply terminal VDD of the downconverter circuit 2. Similarly, the power can be supplied from the regulator REG21 to the power supply terminal VDD of the downconverter circuit 1.

More specifically, with the downconverter according to the present embodiment, if the power is not supplied to the downconverter circuit 1, the power cannot be supplied from the regulator REG11 to the power supply terminal VDD of the downconverter circuit 1. In this case, however, the power can be supplied from the regulator REG21 to the power supply terminal VDD of the downconverter circuit 1. Similarly, if the power is not supplied to the downconverter circuit 2, the power cannot be supplied from the regulator REG21 to the power supply terminal VDD of the downconverter circuit 2. In this case, however, the power can be supplied from the regulator REG11 to the power supply terminal VDD of the downconverter circuit 2. Accordingly, even if one of the downconverter circuits is in the power-saving mode, it is possible to supply the power from the other downconverter circuit to the one of the downconverter circuits.

As described in the foregoing, with the use of the downconverter according to the present embodiment, it is possible to provide both a downconverter and a downconverter IC that can be normally operated even in the case of making up a universal dual converter using a plurality of downconverter circuits, and a method for controlling the downconverter.

Second Embodiment

Figure 8:
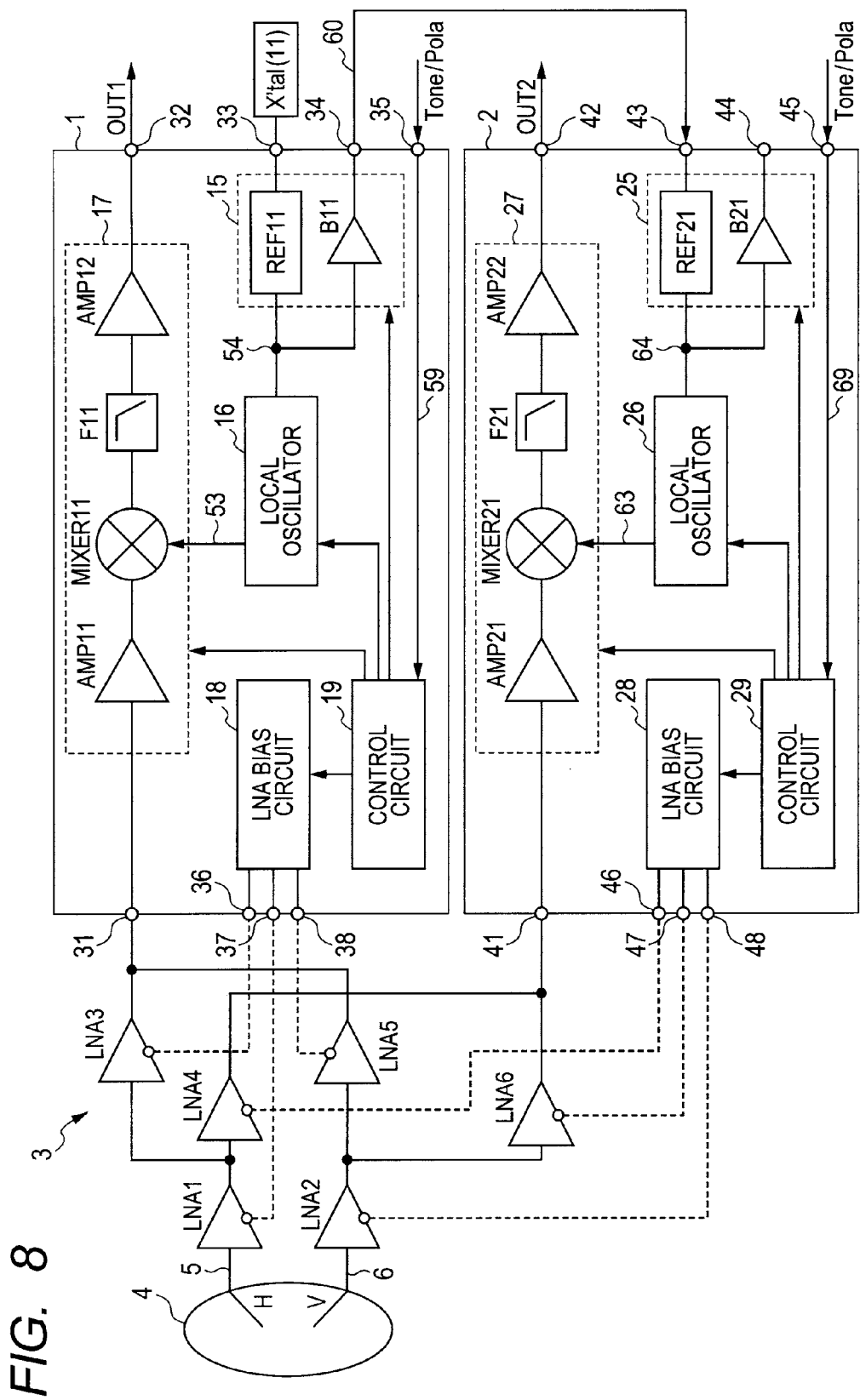
FIG. 8 is a block diagram showing a downconverter according to a second embodiment of the invention.

There is described hereinafter a second embodiment of the invention. FIG. 8 is a block diagram showing a downconverter according to the second embodiment of the invention. The downconverter shown in FIG. 8 differs from the downconverter according to the first embodiment of the invention in that only a downconverter circuit 1 is provided with a quartz resonator X'tal (11). Otherwise, the downconverter according to the present embodiment is the same as the downconverter according to the first embodiment, so that identical constituent elements are denoted by like reference numerals, respectively, omitting therefore duplication in description.

As shown in FIG. 8, with the downconverter according to the present embodiment, the quartz resonator X'tal (11) is coupled to a terminal 33 of the downconverter circuit 1. And a crystal oscillation circuit REF11 generates a reference signal 54 having a predetermined reference frequency by use of the quartz resonator X'tal (11), outputting the reference signal 54 to a local oscillator 16. Further, the reference signal 54 is amplified by a buffer 11 to be outputted from a terminal 34 of the downconverter circuit 1 to a terminal 43 of a downconverter circuit 2. The buffer B11 is set to always be kept in an operating state irrespective of its control state.

A reference signal generator 25 of the downconverter circuit 2 generates a reference signal 64 by making use of a reference signal 60 (a signal obtained by amplifying the reference signal 54 by use of the buffer 11) outputted from the downconverter circuit 1. Herein, the reference signal 54 is typically identical in frequency to the reference signal 64. Accordingly, in this case, a crystal oscillation circuit REF21 of the downconverter circuit 2 functions as a buffer for amplifying the reference signal 60 outputted from the downconverter circuit 1. The buffer B21 is set to always be in a non-operating state irrespective of its control state.

With the downconverter according to the present embodiment, in the case where the intermediate frequency signal OUT1 is outputted while the intermediate frequency signal OUT2 is not outputted (OUT1 is in the ON state and OUT2 is in the OFF state), the downconverter circuit 2 is in the power-saving mode. In this case, a control circuit 29 causes a local oscillator 26 and a frequency converter 27 to be in the non-operating state, causes a reference signal generator 25 to be in the operating state, and controls a LNA bias circuit 28 such that the power is supplied to the LNA 2.

On the other hand, in the case where the intermediate frequency signal OUT2 is outputted while the intermediate frequency signal OUT1 is not outputted (OUT1 is OFF and OUT2 is ON), the downconverter circuit 1 is in the power-saving mode. In this case, a control circuit 19 causes the local oscillator 16, and a frequency converter 17 to be in the non-operating state while a reference signal generator 15 (a crystal oscillation circuit REF11 and a buffer B11) is caused to be in the operating state, and controlling an LNA bias circuit 18 such that the power is supplied to an LNA 1.

That is to say, with the downconverter according to the present embodiment, in the case where the downconverter circuit 1 is in the power-saving mode (OUT1 is OFF, and OUT2 is ON), the reference signal generator 15 is caused to be in the operating state, thereby enabling the reference signal 60 to be outputted to the downconverter circuit 2. By so doing, it is possible to omit the quartz resonator X'tal (21) (refer to the first embodiment) otherwise coupled to a terminal 43 of the downconverter circuit 2. Since the quartz resonator is a component high in cost, the omission of the quartz resonator X'tal (21) can effectively contribute to reduction in the manufacturing cost of the downconverter and space thereof.

Still further, the case where the quartz resonator is coupled to the downconverter circuit 1 has been described in the foregoing. However, the quartz resonator may be coupled to the terminal 43 of the downconverter circuit 2 instead of coupling the quartz resonator to the downconverter circuit 1, thereby delivering the reference signal outputted from a terminal 44 of the downconverter circuit 2 to a terminal 33 of the downconverter circuit 1.

The buffers in the respective reference signal generators in the first and second embodiments may be controlled with a buffer control terminal provided outside the package, independently from the control circuit 19 and the control circuit 29.

Furthermore, with the first and second embodiments, there has been described the case of receiving the horizontally polarized wave signal and the vertically polarized wave signal. However, the polarized wave signals may be substituted for a left-handed circularly polarized wave signal and a right-handed circularly polarized wave signal.

While the invention has been described with reference to the embodiments as above, it is to be understood that the invention be not limited to any of the details of description unless otherwise specified; and various variations, modifications, and combinations will obviously occur to those skilled in the art without departing from the spirit or scope of the following claims.

What is claimed is:

1. A downconverter comprising:
an amplification unit;
a first downconverter circuit; and
a second downconverter circuit, the amplification unit comprising at least:
a first amplifier for receiving a first polarized wave signal; and
a second amplifier for receiving a second polarized wave signal, the first downconverter circuit comprising:
a first reference signal generator for generating a first reference signal having a first reference frequency;
a first local oscillator for generating a first local oscillation frequency signal by use of the first reference signal;
a first frequency converter for converting a signal amplified by the amplification unit into an intermediate frequency by use of the first local oscillation frequency signal;
a first bias circuit for supplying the first amplifier with power; and
a first control circuit for controlling the first reference signal generator, the first local oscillator, the first frequency converter, and the first bias circuit in accordance with a first control signal, the second downconverter circuit comprising:
a second reference signal generator for generating a second reference signal having a second reference frequency;
a second local oscillator for generating a second local oscillation frequency signal by use of the second reference signal;
a second frequency converter for converting a signal amplified by the amplification unit into an intermediate frequency by use of the second local oscillation frequency signal;
a second bias circuit for supplying the second amplifier with power; and
a second control circuit for controlling the second reference signal generator, the second local oscillator, the second frequency converter, and the second bias circuit in accordance with a second control signal,
wherein, when the first control signal comprises an indicator of a power-saving mode, the first control circuit is configured to cause both the first local oscillator and the first frequency converter to be in a non-operating state, and controls the first bias circuit such that power is supplied to the first amplifier,
wherein, when the second control signal comprises an indicator of the power-saving mode, the second control circuit is configured to cause both the second local oscillator and the second frequency converter to be in the non-operating state, and controls the second bias circuit such that power is supplied to the second amplifier.

2. The downconverter according to claim 1,
wherein the first reference signal generator comprises a crystal oscillation circuit for generating the first reference signal using a quartz resonator,
wherein the second reference signal generator is configured to cause the first reference signal generated by the first reference signal generator to be the second reference signal, and
wherein, even if the first control signal is the signal comprises an indicator of the power-saving mode, the first control circuit is configured to cause the first reference signal generator to be in an operating state.

3. The downconverter according to claim 1,
wherein the first control signal comprises a first mode select signal for switching among a state where the amplification unit is configured to output the first polarized wave signal that is amplified to the first downconverter circuit, a state where the amplification unit is configured to output the second polarized wave signal that is amplified to the first downconverter circuit, and a state where the first downconverter circuit is turned into a power-saving mode,
wherein the second control signal comprises a second mode select signal for switching among a state where the amplification unit is configured to output the first polarized wave signal that is amplified to the second downconverter circuit, a state where the amplification unit is configured to output the second polarized wave signal that is amplified to the second downconverter circuit, and a state where the second downconverter circuit is turned into a power-saving mode.

4. The downconverter according to claim 3, wherein the first and second mode select signals each comprise a DC component of the respective signal for selecting any of the respective states by use of any of three potential states.

5. The downconverter according to claim 3,
wherein the first control signal comprises a first band-select signal for switching the frequency of the first local oscillation frequency signal output from the first local oscillator,
wherein the second control signal comprises a second band-select signal for switching the frequency of the second local oscillation frequency signal output from the second local oscillator, and
wherein the first and second band-select signals each are an AC component signal superimposed on the first and second mode select signals, respectively.

6. The downconverter according to claim 1, further comprising:
a first regulator for adjusting a DC voltage supplied from a first tuner via a first output terminal, an intermediate frequency signal output from the first downconverter circuit being supplied to the first tuner via the first output terminal, configured to output the DC voltage to the first downconverter circuit and the second downconverter circuit; and a second regulator for adjusting a DC voltage supplied from a second tuner via a second output terminal, an intermediate frequency signal output from the second downconverter circuit being supplied to the second tuner via the second output terminal, outputting the DC voltage to the first downconverter circuit and the second downconverter circuit.

7. The downconverter according to claim 1, wherein the first frequency converter and the second frequency converter each comprise:
   a preamp for amplifying a signal amplified by the amplification unit;
   a mixer for converting a signal output from the preamp into an intermediate frequency signal by use of the first or second local oscillation frequency signal output;
   a first low-pass filter for removing a high frequency component of a signal output from the mixer; and
   an IF amp for amplifying a signal output from the mixer.

8. The downconverter according to claim 1,
   wherein the amplification unit further comprises:
      a third amplifier for receiving a signal output from the first amplifier and amplifying the signal to be output to the first downconverter circuit;
      a fourth amplifier for receiving the signal output from the first amplifier and amplifying the signal to be output to the second downconverter circuit;
      a fifth amplifier for receiving a signal output from the second amplifier and amplifying the signal to be output to the first downconverter circuit; and
      a sixth amplifier for receiving the signal output from the second amplifier and amplifying the signal to be output to the second downconverter circuit,
   wherein the first amplifier, the third amplifier, and the fifth amplifier are supplied with power from the first downconverter circuit,
   wherein the second amplifier, the fourth amplifier, and the sixth amplifier are supplied with power from the second bias circuit.

9. The downconverter according to claim 1,
   wherein the first and second local oscillators each comprise:
      a phase comparator;
      a second low-pass filter for removing an unnecessary component of the signal output from the phase comparator;
      a voltage control oscillator for controlling the frequency of an output signal according to a voltage of a signal output from the low-pass filter; and
      a frequency divider for causing an output signal output from the voltage control oscillator to undergo frequency division,
   wherein the frequency divider comprises a first path for dividing the frequency of the output signal output from the voltage control oscillator at a first frequency-dividing ratio and a second path for dividing the frequency of the output signal output from the voltage control oscillator at a second frequency-dividing ratio, and a path through which the frequency of the output signal output from the voltage control oscillator is divided is switched in accordance with the first band-select signal and the second band-select signal.

10. The downconverter according to claim 1, wherein the first polarized wave signal is, one of: a vertically polarized wave signal and a horizontally polarized wave signal, while the second polarized wave signal is the other of the vertically polarized wave signal and the horizontally polarized wave signal.

11. The downconverter according to claim 1, wherein the first downconverter circuit and the second downconverter circuit each are formed in one IC chip.

12. The downconverter according to claim 2,
   wherein the first control signal comprises a first mode select signal for switching among a state where the amplification unit is configured to output the first polarized wave signal that is amplified to the first downconverter circuit, a state where the amplification unit is configured to output the second polarized wave signal that is amplified to the first downconverter circuit, and a state where the first downconverter circuit is configured to be in a power-saving mode,
   wherein the second control signal comprises a second mode select signal for switching among a state where the amplification unit is configured to output the first polarized wave signal that is amplified to the second downconverter circuit, a state where the amplification unit is configured to output the second polarized wave signal that is amplified to the second downconverter circuit, and a state where the second downconverter circuit is configured to be in a power-saving mode.

13. The downconverter according to claim 4,
   wherein the first control signal comprises a first band-select signal for switching the frequency of the first local oscillation frequency signal output from the first local oscillator,
   wherein the second control signal comprises a second band-select signal for switching the frequency of the second local oscillation frequency signal output from the second local oscillator,
   wherein the first and second band-select signals each are an AC component signal superimposed on the first and second mode select signals, respectively.

14. A downconverter IC comprising:
   a reference signal generator or generating a reference signal having a predetermined reference frequency;
   a local oscillator for generating a local oscillation frequency signal by use of the reference signal;
   a frequency converter for converting a polarized signal amplified by an amplifier into an intermediate frequency by use of the local oscillation frequency signal;
   a bias circuit for supplying the amplifier with power; and
   a control circuit for controlling the reference signal generator, the local oscillator, the frequency converter, and the bias circuit in accordance with a control signal,
   wherein, when the control signal comprises an indicator of a power-saving mode, the control circuit is configured to cause both the local oscillator and the frequency converter to be in a non-operating state, and control the bias circuit such that power is supplied to the amplifier.

15. A method for controlling a downconverter provided with an amplification unit, a first downconverter circuit, and a second downconverter circuit, the amplification unit comprising at least a first amplifier for receiving a first polarized wave signal, and a second amplifier for receiving a second polarized wave signal, the first downconverter circuit comprising a first reference signal generator for generating a first reference signal having a first reference frequency, a first local oscillator for generating a first local oscillation frequency signal by use of the first reference signal, a first frequency converter for converting a signal amplified by the amplification unit into an intermediate frequency by use of the first local oscillation frequency signal, a first bias circuit for supplying the first amplifier with power, and a first control circuit for controlling the first reference signal generator, the first local oscillator, the first frequency converter, and the first bias circuit in accordance with a first control signal, the second downconverter circuit including a second reference signal generator for generating a second reference signal having a second reference frequency, a second local oscillator for generating a second local oscillation frequency signal by use of the second reference signal, a second frequency converter for converting a signal amplified by the amplification unit into an intermediate frequency by use of the second local oscillation frequency signal, a second bias circuit for supplying the second amplifier with power, and a second control circuit for controlling the second reference signal generator, the second local oscillator, the second frequency converter, and the second bias circuit in accordance with a second control signal, the method comprising:
   setting both the first local oscillator and the first frequency converter to a non-operating state when the first control signal comprises an indicator of a power-saving mode, controlling the first bias circuit such that power is supplied to the first amplifier; and
   setting both the second local oscillator and the second frequency converter to a non-operating state when the second control signal comprises an indicator of the power-saving mode, controlling the second bias circuit such that power is supplied to the second amplifier.

\* \* \* \* \*